(12) United States Patent
Shefet

(10) Patent No.: US 6,821,542 B2
(45) Date of Patent: Nov. 23, 2004

(54) METHODS, DEVICES, AND SYSTEMS FOR SECURING OR REMOVING LEADING EDGE PORTIONS OF MOVING FOOD PRODUCTS

(75) Inventor: Sarid M. Shefet, Cary, NC (US)

(73) Assignee: ConAgra Foods, Inc., Edina, MN (US)

( * ) Notice: Subject to any disclaimer, the term of this patent is extended or adjusted under 35 U.S.C. 154(b) by 243 days.

(21) Appl. No.: 10/170,823

(22) Filed: Jun. 13, 2002

(65) Prior Publication Data

US 2003/0194476 A1 Oct. 16, 2003

Related U.S. Application Data

(60) Provisional application No. 60/372,272, filed on Apr. 12, 2002.

(51) Int. Cl.$^7$ ............................ A22C 11/00; A22C 13/00
(52) U.S. Cl. ........................ 426/512; 426/105; 426/140; 426/513; 452/32; 452/51
(58) Field of Search ................................. 426/512, 513, 426/105, 140, 646, 32, 51; 53/122

(56) References Cited

U.S. PATENT DOCUMENTS

| 2,697,850 A | 12/1954 | Cross | 17/34 |
|---|---|---|---|
| 3,022,745 A | 2/1962 | Roberts | 104/99 |

(List continued on next page.)

FOREIGN PATENT DOCUMENTS

FR          2.088.622          4/1970

OTHER PUBLICATIONS

Article, "Continuous Process Systems", Alkar, htpp://www.alkar.com (date unavailable: believed to be dated before Mar. 1, 2002) pp. 1–3.

Article, "Batch Ovens", Alkar, http://www.alkar.com (date unavailable; believed to be dated before Mar. 1, 2002) pp. 1–3.

Brochure, "Fessmann Turbomat 7000: Industrial Smoking and Cooking", Fessman Group (date unavailable: believed to be dated before Mar. 1, 2002) pp. 1–8.

Brochure, "Fessmann Smoking Cooking Cooling", Fessman Group (date unavailable: believed to be dated before Mar. 1, 2002) pp. 1–8.

Brochure, "Fessmann Transfer 4000: Continuous Smoking, Cooking and Cooling", Fessman Group (date unavailable: believed to be dated Mar. 1, 2002) pp. 1–9.

Pictures of the inside of a conventional prior art oven from Alkar.

*Primary Examiner*—George C. Yeung
(74) *Attorney, Agent, or Firm*—Myers Bigel Sibley & Sajovec PA

(57) ABSTRACT

Methods and apparatus for shaping or forming the leading edge portion of an elongated food product include: (a) moving an elongated food item forward over a first travel lane in a predetermined travel path in a food processing system, the elongated food item having a leading edge portion that extends beyond the primary body portion of the food, the travel lane having a floor food support surface, the food item residing on the floor support surface; (b) blowing the leading edge portion of the food item in an upward direction away from the floor support surface while the food item is moving forward in the first travel lane; and then (c) forcing the leading edge portion of the food item rearward so that it overlies and contacts an upper portion of the primary body of the food item while the food item is moving forward. Other methods and devices cut the leading edge portion of the elongated product, that may be a meat product stuffed into a casing, before the product moves up an inclined ramp.

51 Claims, 13 Drawing Sheets

FIG. 3B.

U.S. PATENT DOCUMENTS

| | | |
|---|---|---|
| 4,079,666 A | 3/1978 | Plemons et al. |
| 4,129,923 A | 12/1978 | Hoegger ............... 17/33 |
| 4,565,282 A | 1/1986 | Olsson et al. |
| 4,582,047 A | 4/1986 | Williams |
| 4,612,684 A | 9/1986 | Kollross ............... 17/45 |
| 4,644,607 A | 2/1987 | Sziede ............... 17/45 |
| 4,761,854 A | 8/1988 | Schnell et al. ............ 17/1 R |
| 4,766,645 A | 8/1988 | Lamartino et al. |
| 4,880,105 A | 11/1989 | Kasai et al. ............ 198/465.4 |
| 4,997,365 A | 3/1991 | Lanham |
| 5,049,108 A | 9/1991 | Staudenrausch |
| 5,053,239 A * | 10/1991 | Vanhatalo et al. ............ 426/513 |
| 5,078,120 A | 1/1992 | Hwang |
| 5,098,332 A | 3/1992 | Handel ............... 452/46 |
| 5,203,734 A * | 4/1993 | Fox et al. ............ 452/32 |
| 5,277,301 A | 1/1994 | Fenty |
| 5,354,229 A | 10/1994 | Markwardt et al. ............ 452/51 |
| 5,354,230 A | 10/1994 | McFarlane et al. ............ 452/51 |
| 5,480,346 A | 1/1996 | Kasai et al. |
| RE35,259 E | 6/1996 | Williams |
| 5,788,563 A | 8/1998 | Nakamura et al. |
| 5,830,050 A | 11/1998 | Nakamura et al. ............ 452/31 |
| 5,942,265 A | 8/1999 | Roberds et al. |
| 6,066,035 A | 5/2000 | Hergott et al. ............ 452/31 |
| 6,277,018 B1 | 8/2001 | Cody et al. ............ 452/51 |
| 6,468,143 B1 | 10/2002 | White et al. ............ 452/32 |
| 6,523,462 B1 | 2/2003 | Johnson et al. ............ 99/443 C |

* cited by examiner

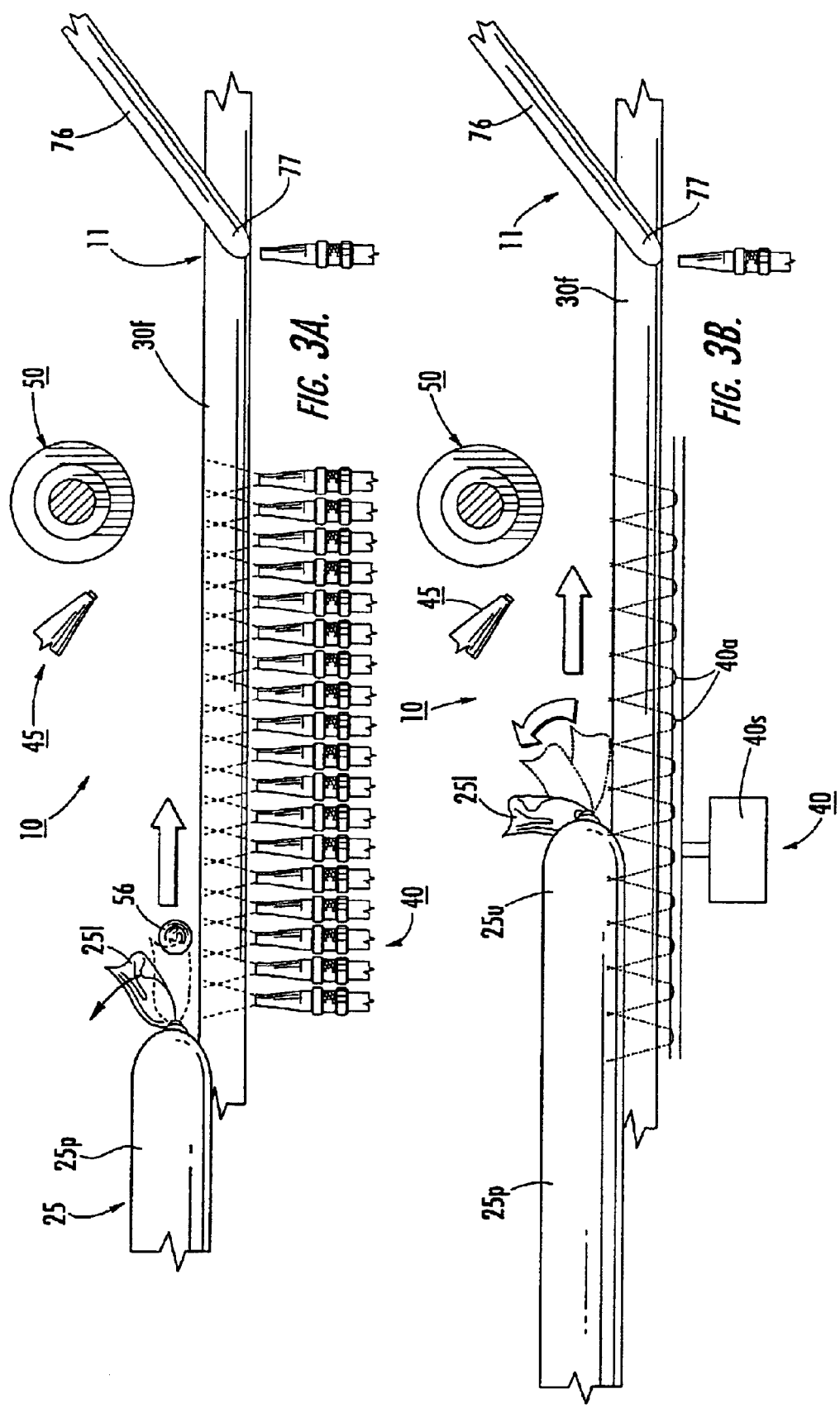

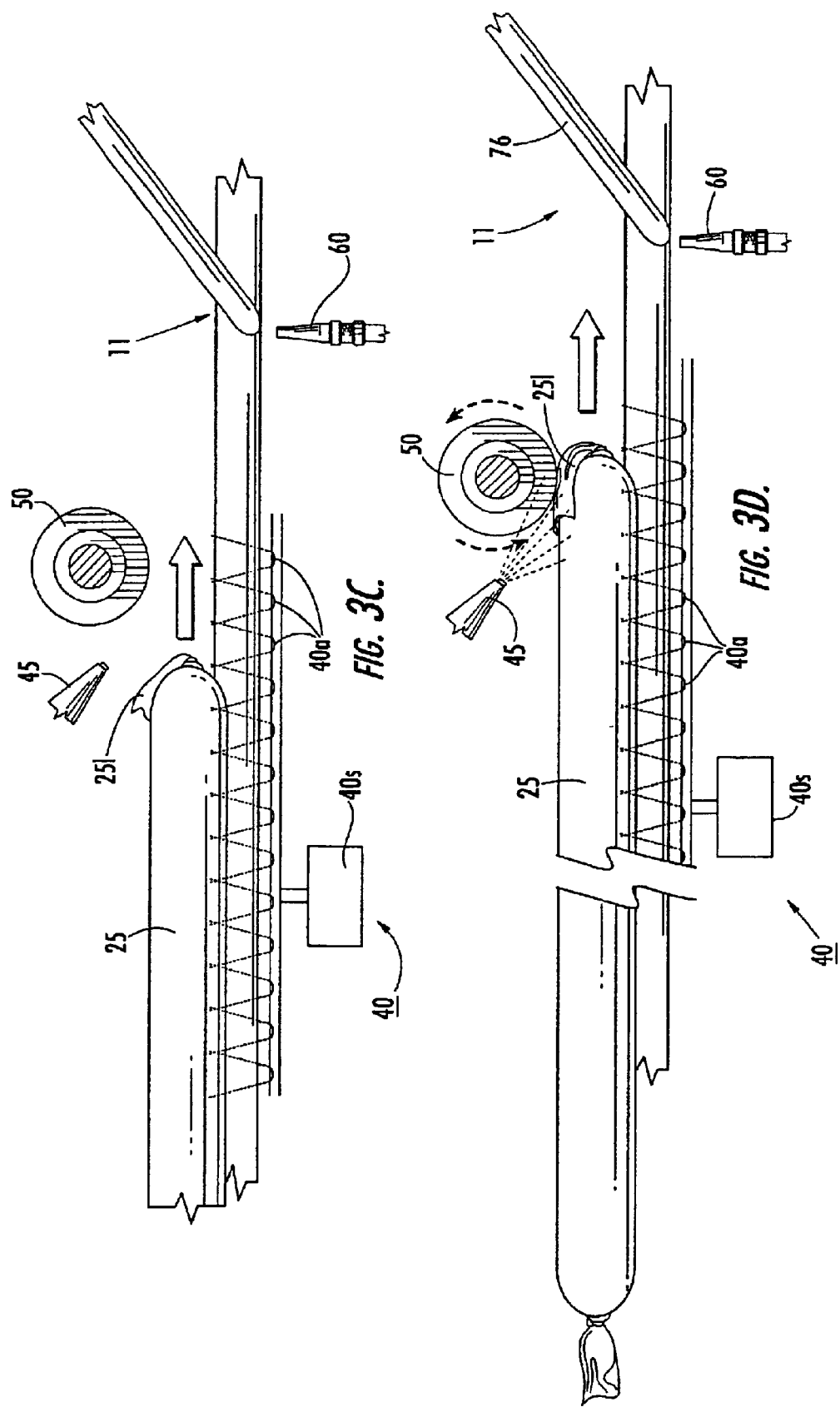

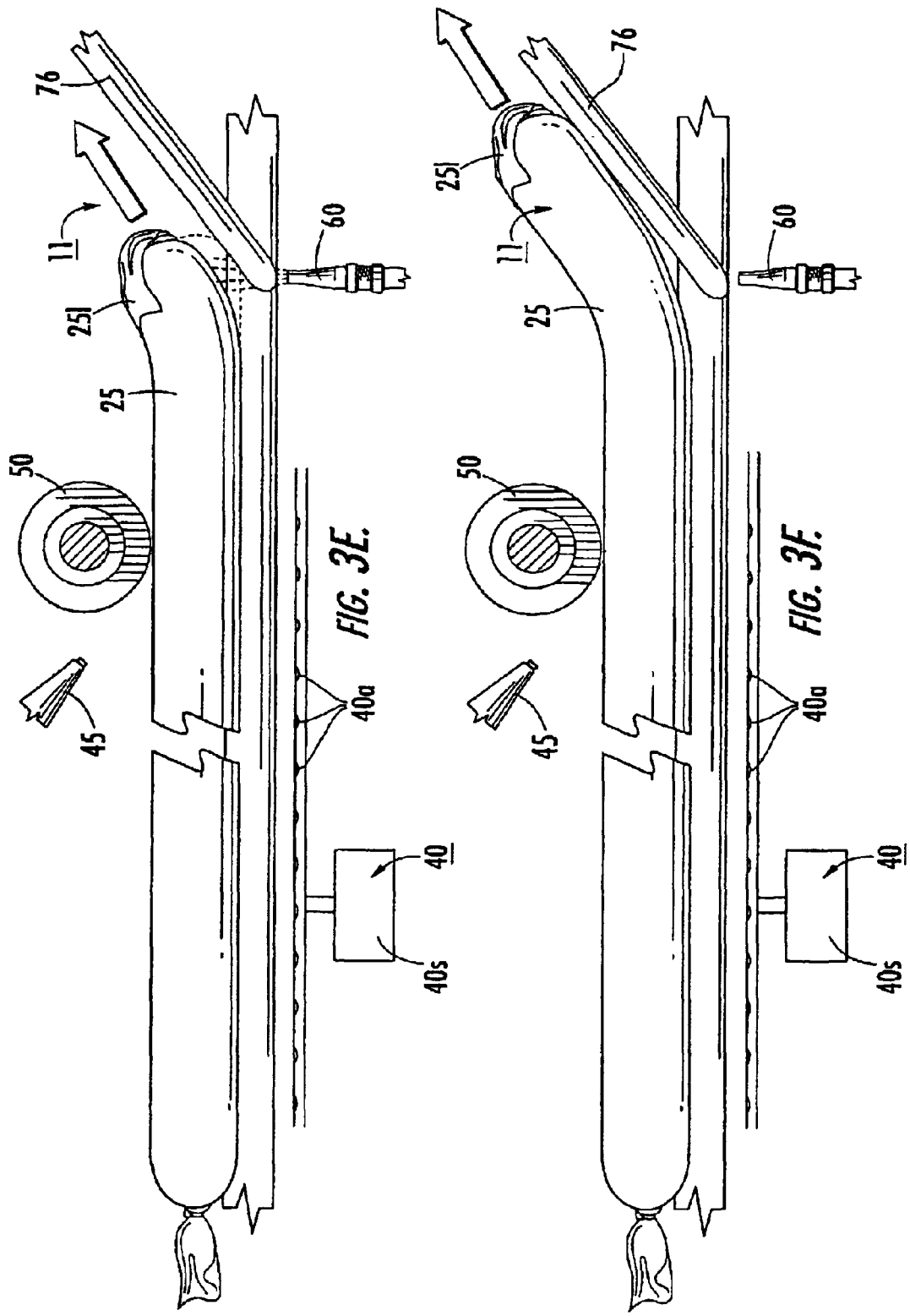

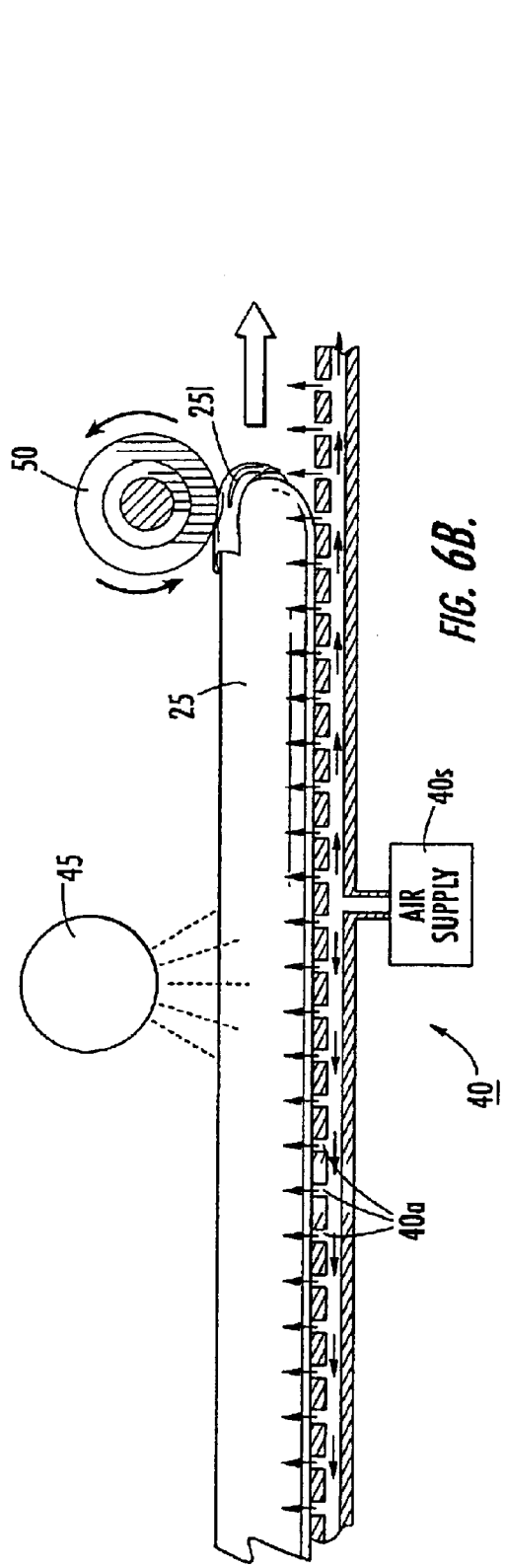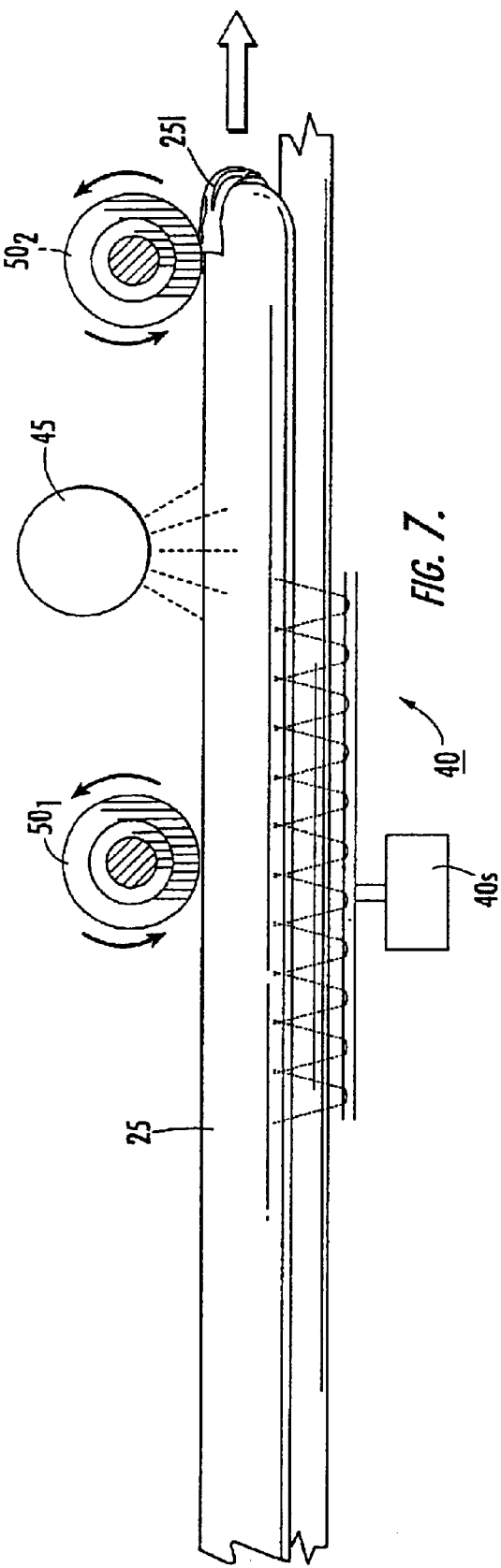

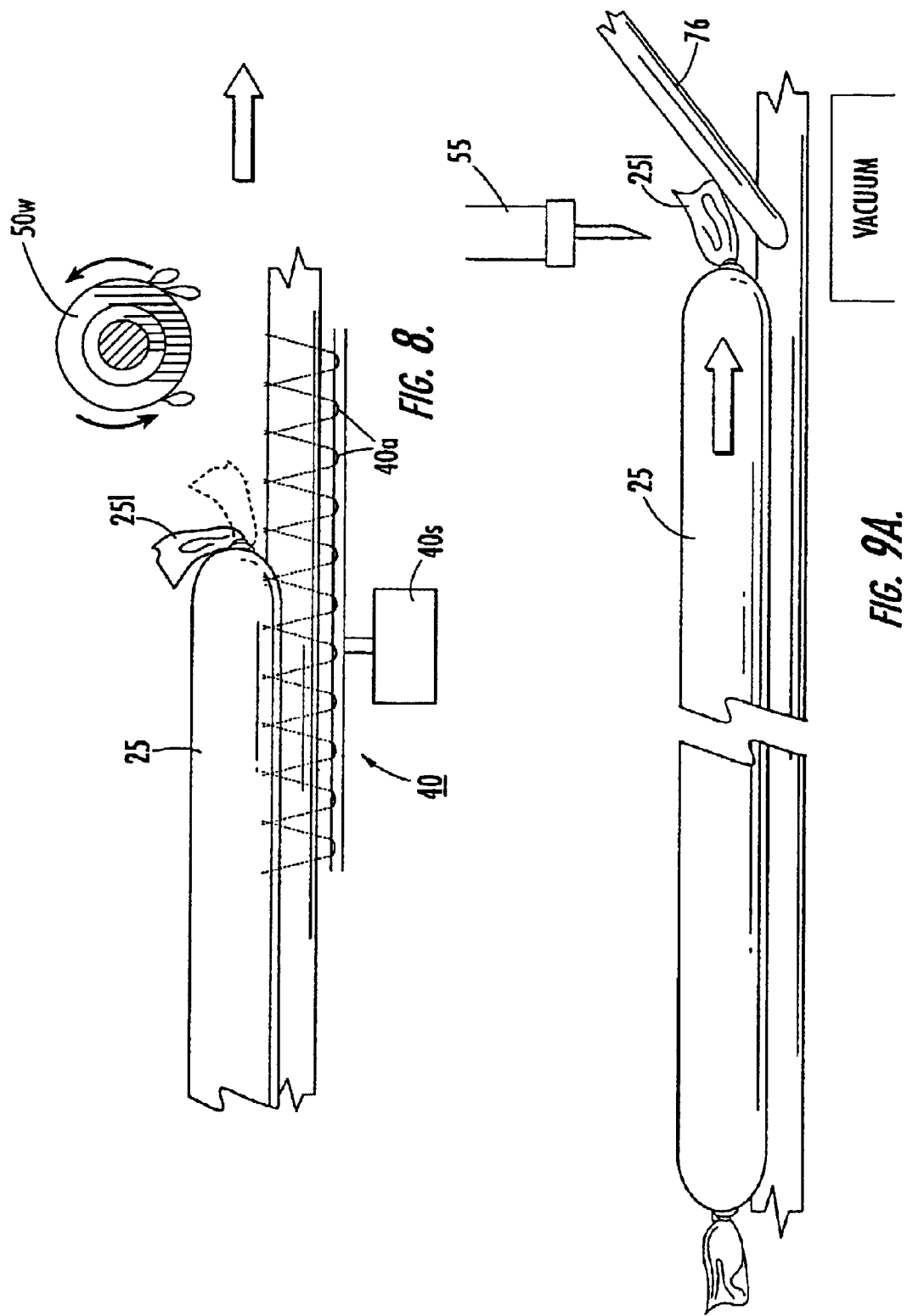

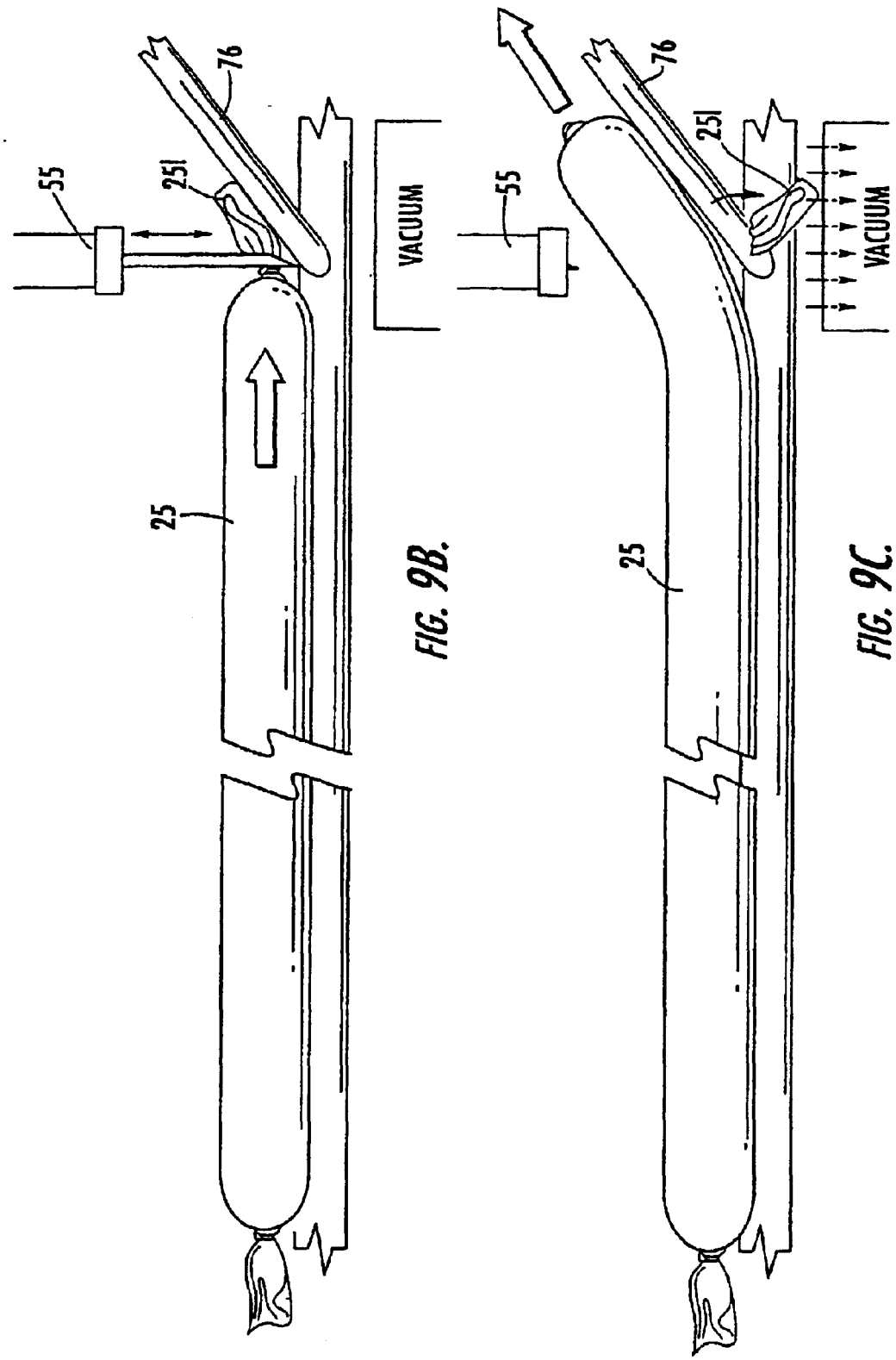

METHODS, DEVICES, AND SYSTEMS FOR SECURING OR REMOVING LEADING EDGE PORTIONS OF MOVING FOOD PRODUCTS

RELATED APPLICATIONS

This application claims priority from U.S. Provisional Patent Application Ser. No. 60/372,272 filed Apr. 12, 2002, the contents of which are hereby incorporated by reference as if recited in full herein.

FIELD OF THE INVENTION

The present invention relates to food treatment systems such as vertical rise dryers, smokers, curing chambers, ovens, warmers, coolers, and freezers.

BACKGROUND OF THE INVENTION

Conventionally, several different food treatment system configurations have been proposed to smoke, cure, dry, cook, cool, or freeze food products (such as meat products) with the hope of increasing production capacity while attempting to limit the floor space required for carrying out same. In so doing, vertical rise systems have been used with spiral conveyors to move food vertically through the oven while exposing the food to certain processing conditions as it moves from top to bottom or bottom to top.

For example, the Northfield LST (Large Spiral Technology) freezer available from Frigoscandia Equipment (fmcfoddtech.com) is a high capacity non-self stacking spiral freezer that employs spiral conveyors with belts available in different widths. Ryson International Inc. of Newport News, Va., provides spiral conveyors that allegedly feature a small footprint and space savings over other brands with load capacities of up to 200 fpm.

Another example is the TURBO-Dryer® from Wyssmont (wyssmont.com). The TURBO-Dryer® uses a stack of slowly rotating circular trays. In operation, food is fed onto the top tray and, after one revolution, is wiped or swept onto the next lower tray where the operation is repeated. The trays are enclosed in a vertical enclosure that circulates heated air or gas about the food on the trays. All or selected levels in the enclosure may be held at a uniform temperature or the enclosure may be configured with zoned temperature regions having different temperatures.

Yet another example of vertical rise system is found in U.S. Pat. No. 5,942,265 which describes conveying pepperoni meat to a conventional spiral dryer which includes a number of tiers (typically about 38–42) according to the initial moisture level, the desired final moisture level, the relative humidity of the air, the total amount of water to be removed, the temperature, and the conveyor speed.

Recently, U.S. patent application Ser. No. 09/888,925 to Shefet et al. describes an increased capacity food processing system that can limit the amount of dedicated floor space required to support the system in food processing facilities and/or increase the amount of food that can be processed through the food processing system over a production period. The contents of this application are hereby incorporated by reference as if recited in full herein. In addition, U.S. Provisional Patent Application Ser. No. 60/354,097, identified by Attorney Docket No. 9281-3PR, filed Feb. 4, 2002, describes food routing apparatus in food processing systems, particularly in high-speed mass production systems, that can effectuate food transfer along desired travel paths in an automated manner that promotes continuous movement and/or inhibits machine or system downtime. The contents of this application are also hereby incorporated by reference as if recited in full herein.

Despite the foregoing, there remains a need to provide methods to inhibit the interruption of food movement along its intended path, particularly for products having leading edge portions that may interfere with the food's forward movement in continuous and/or automated processing systems.

SUMMARY OF THE INVENTION

The present invention provides methods, devices, and systems for forming or shaping the leading edge of a product. The product/and or the devices may move along a predetermined travel path during the forming operations. That is, the product, the shaping devices, or both may be configured to move thereby inhibiting food movement disruption in substantially continuously moving production lines. In certain embodiments, forming or shaping mechanisms are positioned at predetermined locations along the travel path and the mechanisms act to either remove, contour, shape, or wipe back the leading edge of the food while the food is moving along its intended path without substantially impeding the food's forward movement.

In certain embodiments, the methods, devices, and systems are configured so as to direct elongated encased food products to travel serially over one or more selected side-by-side travel paths and the shaping or forming can be carried out selectively in a selected traveled lane. The methods and devices can be configured to operate to direct the leading edge portion of the encased food product to turn back to overlie and rest against the top portion of the outer perimeter or outer surface of the food product. In certain embodiments, the leading edge portion is secured to the top portion of the food product so that it remains in position thereat as the food moves forward in its desired travel path in the food processor.

Certain embodiments are directed to methods for shaping or forming the leading edge portion of an elongated food product. The methods can include: (a) moving an elongated food item forward over a travel lane in a predetermined travel path in a food processing system, the elongated food item having a leading edge portion that extends beyond the primary body portion of the food, the travel lane having a floor food support surface, the food item residing on the floor support surface; (b) blowing the leading edge portion of the food item away from the primary direction of travel while the food item is moving forward in the travel lane; and then (c) deflecting the leading edge portion of the food item so that it overlies and contacts a portion of the primary body of the food item while the food item is moving forward.

In particular embodiments, the method may also include introducing liquid onto the upper portion of the primary body of the elongated food item after initiation of the blowing step and attaching the leading edge to the upper portion of the primary body of the food.

Other methods are directed to moving food items to be cooked or cured through a food processor having an oven and a plurality of side by side travel lanes, comprising: (a) concurrently transporting a plurality of strands of elongated food such that the elongated food strands travel over separate ones of side-by-side selectable pre-determined travel lanes in a predetermined travel path in a food processor, the elongated food strands each starting with a leading edge portion that extends beyond the primary body portion of the food, and wherein the travel lanes each have a floor food support surface, the food item in each lane residing on the respective floor support surface; (b) blowing the leading edge portion of the food items in a direction away from the primary direction of travel while the food strands are moving forward, each in its respective travel lane; and then (c) deflecting the leading edge portion of the food strands so that they overlie and contact the primary body of the food while the food strands are moving forward.

In certain embodiments, the elongated food strand is a meat product held in a casing.

Other embodiments of the present invention are directed to apparatus or mechanisms for manipulating leading edges of moving food. The device includes: (a) a food support floor having a portion that is configured to selectively permit the passage of forced gas therefrom; (b) a pressurized gas source in fluid communication with the floor; and (c) a pressing member positioned downstream of the start of the portion of the floor that emits forced gas. The pressing member is disposed above the floor a predetermined distance, the distance corresponding to the height of a food item that, in operation, travels on the floor under the pressing member. In operation, the food continuously travels through the mechanism causing the leading edge portion of the food item to be forced rearward with respect to the primary direction of travel of the food and attached to the back of the food as the food moves through the mechanism.

The device may further include a liquid source configured to release liquid onto the food as the food moves through the device. The liquid source is positioned downstream of the start of the portion of the floor that emits forced gas, proximate to the pressing member, and above the floor a predetermined distance so that, in operation, the liquid source resides above the food as the food travels thereunder.

Other embodiments are directed to an apparatus for shaping or forming the leading edge portion of an elongated food product. The apparatus includes: (a) means for moving an elongated food item forward over a first travel lane in a predetermined travel path in a food processing system, the elongated food item having a leading edge portion that extends beyond the primary body portion of the food, the travel lane having a floor food support surface, the food item residing on the floor support surface; (b) means for blowing the leading edge portion of the food item in a direction away from the floor support surface while the food item is moving forward in the first travel lane; and then (c) means for deflecting the leading edge portion of the food item rearward so that it overlies and contacts a portion of the primary body of the food item while the food item is moving forward.

Still other embodiments of the present invention are directed to methods for removing the leading edge portion of an elongated food item while the elongated food item is moving in a predetermined travel path in a food processing system. The method includes: (a) moving an elongated food item forward over a first travel lane in a predetermined travel path in a food processing system, the elongated food item having a leading edge portion that extends beyond the primary body portion of the food, the travel lane having a floor food support surface, the food item residing on the floor support surface; and (b) cutting the leading edge portion of the food item while the food item is moving forward in the first travel lane without substantially deforming the shape of the primary body of the elongated food item.

Similarly, other embodiments of the present invention are directed to apparatus for processing elongated food product having a primary body portion and a leading edge portion. The apparatus includes: (a) a food travel path comprising a plurality of side-by-side travel lanes, the travel lanes each comprising at least one moving floor configured to move an elongated food product in a predetermined travel path, wherein the food product is configured to travel over at least two of said travel lanes; (b) a plurality of pick-up guides, a respective one for each of the travel lanes, positioned in cooperative communication with the moving floor, the pick-up guides having upwardly extending opposing sidewall portions and opposing food ingress and egress portions with a ramped portion extending therebetween; and (c) a cutter configured upstream of the pick-up guides above at least one of said travel lanes to controllably extend down a distance to remove the leading edge portion of the elongated food product before the product moves into the respective pick-up guide.

The apparatus may also include a plurality of router guide channels located downstream of the pick-up guides and in cooperating communication therewith. Each guide channel has upwardly extending sidewalls that overlie a guide channel floor adapted to support the food as the food travels through a respective guide channel. In operation, the router guide channels guide the food product from a first travel lane into a different predetermined laterally altered travel lane. The guide channels' upwardly extending sidewalls define an angular departure from the primary travel direction between the pick-up guides and the portion of the predetermined travel path that is located downstream of the router guide channels, so that, in operation, the at least one food product is directed to travel through a respective guide channel and laterally alter its travel path from a first travel lane to a second predetermined travel lane.

In certain embodiments the food product is an elongated meat product held in a casing, the elongated meat product can have a length of between about 20–85 feet.

The foregoing and other objects and aspects of the present invention are explained in detail in the specification set forth below.

BRIEF DESCRIPTION OF THE DRAWINGS

FIGS. 3A–3F are side partial cutaway views of a portion of a predetermined travel path illustrating a sequence of operations as the food item moves along the travel path to shape the leading edge according to embodiments of the present invention.

FIG. 6B is a side view of the embodiment shown in FIG. 6A.

FIG. 7 is a side view of a portion of a predetermined travel path of yet another embodiment of the present invention.

FIG. 8 is a side view of portion of a predetermined travel path of an additional embodiment of the present invention.

FIGS. 9A–9C are side partial cutaway views of a portion of a predetermined travel path illustrating a sequence of operations as the food item moves along the travel path to shape the leading edge according to embodiments of the present invention.

DESCRIPTION OF EMBODIMENTS OF THE INVENTION

Figure 1:
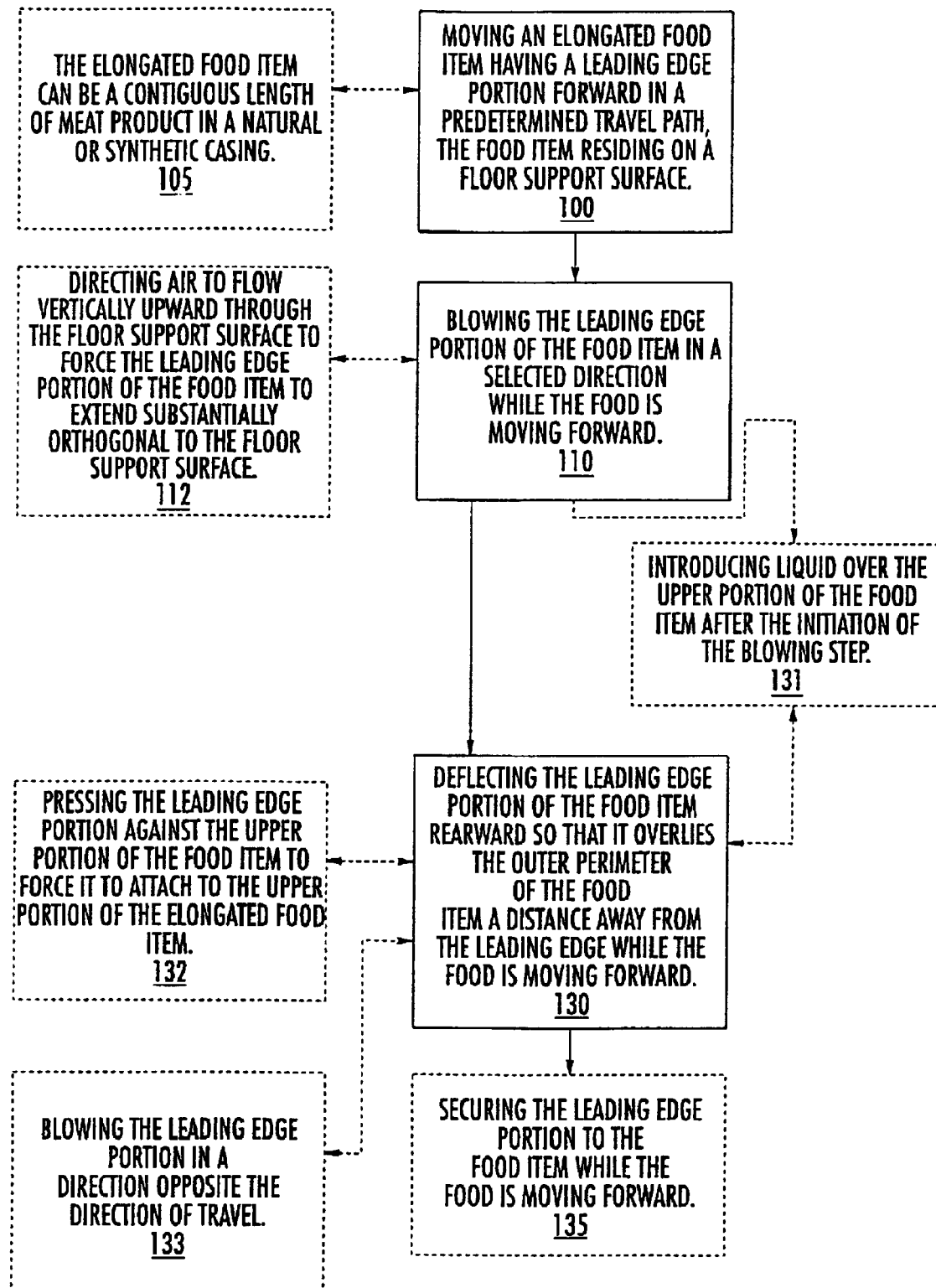
FIG. 1 is a block diagram of operations for shaping the leading edge portion of an elongated food item as it moves through a portion of a food processor according to embodiments of the present invention.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain layers, components or features may be exaggerated for clarity, and broken lines, unless stated otherwise, illustrate optional features or operations.

In the description of the present invention that follows, certain terms are employed to refer to the positional relationship of certain structures relative to other structures. As used herein, the term "forward" and derivatives thereof refer to the general or primary direction that food travels as it moves inside a food processor from a processing point or region to the next processing point or region; this term is intended to be synonymous with the term "downstream," which is often used in manufacturing environments to indicate that certain material being acted upon is farther along in the manufacturing process than other material. Conversely, the terms "rearward" and "upstream" and derivatives thereof refer to the directions opposite, respectively, the forward and downstream directions.

The present invention is directed to methods, apparatus, and devices suitable for food processing/processor systems. The systems can be used in commercial low volume and/or large-scale mass production of food items. The food processor system can be a vertical rise system and can include different zones exposed to different processing conditions, such as one or more of a dryer, a heater, an oven, a curing or smoking source, a cooler or refrigerator or freezer and the like. The food processor can be configured to process elongated solid or semi-solid food items or liquid items in containers or casings. Examples of food items include, but are not limited to, candies, baking or dairy products, and meat products. In certain embodiments, the food processing system and/or related devices may be particularly suitable to process discrete elongated low profile items (substantially planar or flat objects), as well as other elongated food items such as, but not limited to, elastic or partially elastic food items such as cheese (like mozzarella strands), dough (for incubation), meat sticks or strands, and the like. See U.S. Pat. No. 4,582,047 and RE35,259, U.S. Pat. Nos. 5,942,265, 5,078,120, and 4,079,666 for discussions of exemplary processing conditions for food and conveyor means, the contents of which are hereby incorporated by reference as if recited in full herein.

In certain embodiments, the present invention is used to move a length of an elongated meat product held or stuffed in a casing. The casing can be any suitable casing (edible or inedible), synthetic or natural (such as a collagen). Exemplary meat products include, but are not limited to, strands of meat such as pepperoni or beef, a processed meat product such as a pepperoni or beef stick, sausage, frankfurter, hotdog, weiner, or the like.

The elongated meat product can be configured as a contiguous or continuous length of product of segmented or non-segmented meat. The length may be selected so as to cover one or a plurality of lanes, tracks or perimeter paths over at least one tier or level. In certain embodiments, the length of product is contiguous or continuous so as to be able to extend over at least one revolution in a lane in a desired travel path. In certain embodiments, the elongated meat product has a length of at least about 20–25 feet, and typically at least about 50 feet. In particular embodiments, the elongated meat product can have a length of between about 50–85 feet or more.

The elongated food item may be elastic (at least in tension) so as to allow stretching without unduly altering or deforming its desired shape during processing. In operation, the elongated meat product may have an exterior surface that exhibits a tactile "tacky" feel or an increased friction relative to a finished, cured, or dried configuration. For example, a collagen casing can be described as having a relatively gelatinous sticky residue prior to its finished state that can cause the food to attempt to stick to a floor or support surface during transport and may make it difficult to route or guide this type of product in an automated relatively fast speed transport arrangement, particularly where non-linear or selectably changeable travel paths are desired.

Turning now to FIG. 1, operations suitable for carrying out embodiments of the present invention are shown. An elongated food item having a leading edge portion and a primary body portion is moved (conveyed or otherwise propelled forward or downstream) in a predetermined travel path (in a food processing system). The food item resides in a travel lane in the predetermined travel path on a corresponding floor support surface (block 100). As noted above, the food item can be a contiguous length of elongated meat product held in a natural or synthetic casing (or combinations thereof) and the leading edge portion can be a length of casing that is substantially unfilled with meat or other product and is relatively light weight (substantially less than the weight of a similar length of casing filled with product) (block 105). The leading edge portion of the food item is blown in a selected direction while the food is moving forward (block 110). The blowing can be carried out by directing air to flow vertically upward through the floor support surface to force the leading edge portion to extend above and/or substantially orthogonal to the floor support surface (block 112). The blowing may also be carried out in other suitable non-vertical directions such as sideward, angular, or downward to direct the leading edge away from the forwardmost portion of the product.

After the leading edge portion is blown away (typically upward, but sideward, or even downward may be suitable in particular situations), the leading edge portion is then deflected and/or forced rearward so that it overlies a portion (of the outer perimeter) of the food item a distance away from the leading edge portion (block 130).

In other embodiments, liquid, such as water or other food-compatible substance, (which may comprise a flavoring, additive, or the like), may be introduced onto the upper portion of the back of the primary body of the food and/or onto the leading edge portion (block 131), after (or concurrently with) the rearward deflection of the leading edge portion whereby the liquid may promote adhesion between the two components.

The leading edge portion may, in certain embodiments, be secured or attached to the outer surface of the primary body while the food is moving forward (block 135). In certain embodiments, the securing operation is carried out so as to attach the leading edge portion to the back or upper portion of the product. The securing can be carried out in a manner that provides a bond that is sufficiently strong so as to hold the leading edge portion in position during the food's processing in the processing facility. The casing material or outer surface of the primary food may be formulated so that sufficient contact with the leading edge portion holds the members together. The forcing step may be carried out by pressing the leading edge portion against the body of the food item while the leading edge portion is facing rearward to force the leading edge portion to conform and/or attach to the outer surface of the food substantially without deforming the shape of the primary body of the elongated food item (block 132). In other embodiments, the leading edge portion can be blown sideward, rearward (and/or downward) with pressurized gas and/or air so that it overlies the body of the food (block 133).

In certain embodiments, the food processing system includes a multi-tier oven with a food travel path that includes a plurality of side-by-side defined travel lanes in each tier. On each or selected tiers, the food item can be directed to travel greater than one revolution, traveling on at least two adjacent lanes on a single tier before moving to the next tier.

Figure 2:
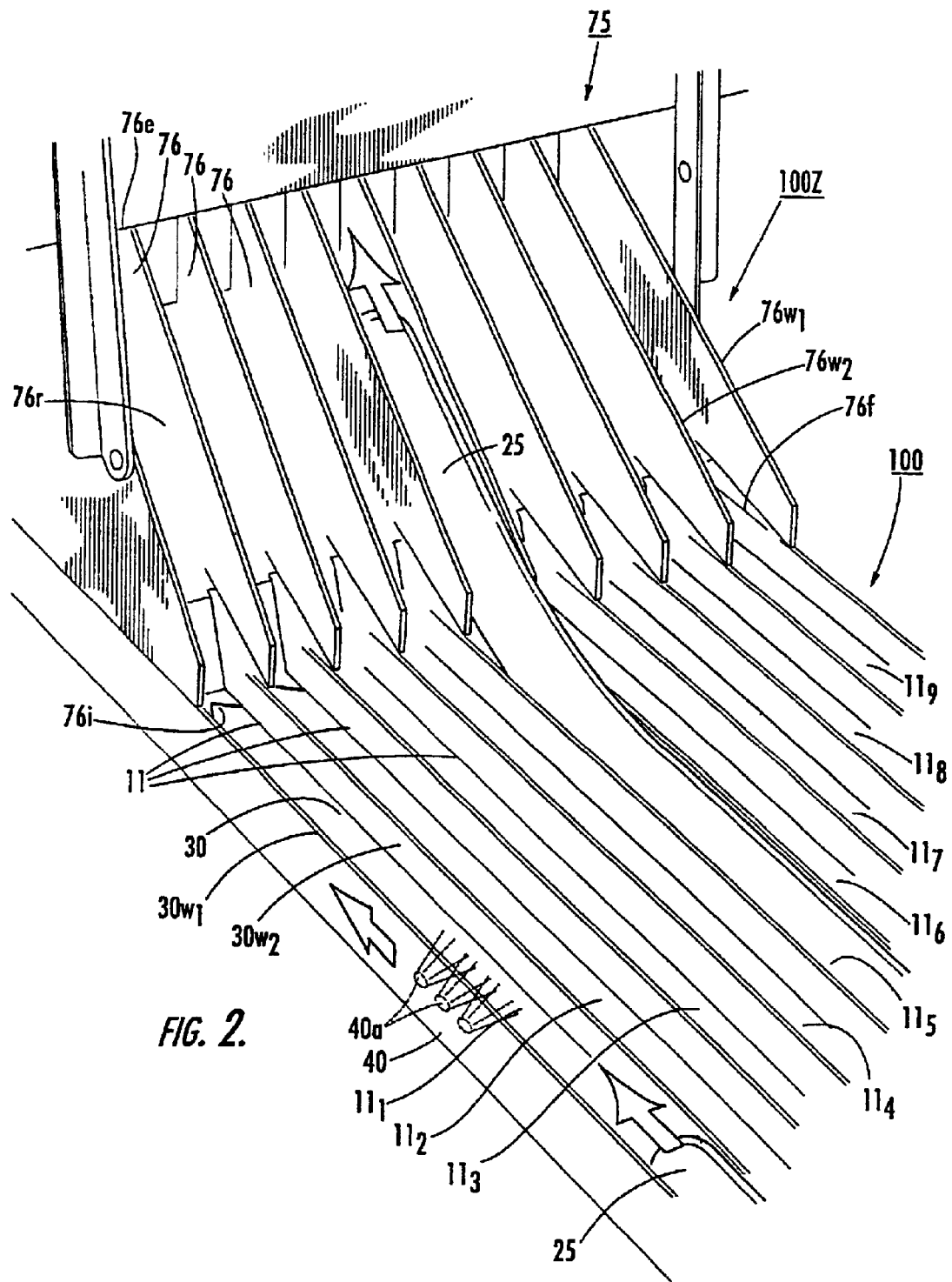
FIG. 2 is a front perspective view of a portion of a multi-lane travel path with a lane pick-up/transfer zone for a food product according to embodiments of the present invention.

Turning to FIG. 2, one embodiment of a portion of a travel path 100 in a food processing system with an elongated food product 25 and a transfer or changeover zone or region 100z (shown as a lateral translation region or zone) is shown. The arrows shown in FIG. 2 with respect to each of the food products 25 (one in lane $11_1$ and the other in lane $11_5$) indicate the direction of travel or food movement along a particular tier. The direction of travel can be reversed where desired and/or alternated between tiers in multi-tier systems.

Still referring to FIG. 2, the travel path 100 shown includes a plurality of side-by-side adjacent travel lanes 11. In the embodiment shown, there are nine side-by-side lanes 11: namely, from the left side to the right side, a first lane $11_1$, a second adjacent lane $11_2$, a third adjacent lane $11_3$, a fourth adjacent lane $11_4$, a fifth adjacent lane $11_5$, a sixth adjacent lane $11_7$, an eight adjacent lane $11_8$, and a ninth adjacent lane $11_9$. In operation, in particular embodiments, the food product 25 can serially progressively travel over each or selected lanes. As such, the food can travel more than one revolution in a particular tier, and in so doing, passes a predetermined reference location associated with the tier a plurality of times. In certain embodiments, the food initiates travel from a predetermined lane (that may be the outer or inner lane) and moves across a selected number, "n," of intermediately positioned lanes to an opposing lane (traversing selected ones or each lane). In the embodiment shown, the product 25 can start from either the inner lane $11_1$ or outer lane $11_9$. For multi-tier configurations with circular, oval, elliptical or other endless lane configurations, the system may be configured so that the food alters travel direction and/or lane progression so as to travel from a selected inner lane portion to a selected outer lane portion then to a selected outer lane portion to a selected inner lane portion on adjacent or selected tiers, or vice versa. For additional description of multi-tier systems and/or the alternating lane travel progression, see U.S. patent application Ser. No. 09/888,925 to Shefet et al., incorporated by reference hereinabove.

In certain embodiments, a plurality of non-connected elongated products are processed concurrently and the products are forced to laterally translate a sufficient distance to cause the products to skip adjacent lanes and to subsequently travel over a respective lane that is laterally spaced over a predetermined number of lanes from its first travel lane. For example, if three separate products 25 are processed, the first may travel in lane $11_1$, the second in lane $11_2$, and the third in lane $11_3$. As they approach the transfer zone 100z, the first product in lane $11_1$ is laterally transferred over to lane $11_4$ (and then to $11_7$ if it travels another revolution over the tier), the second product to $11_5$ (and then to $11_8$ if it travels another revolution over the tier), and the third product travels or is diverted to lane $11_6$ (and then to $11_9$ if it travels another revolution over the tier).

Referring again to FIG. 2, a router guide assembly 75 is also shown. The router guide assembly 75 includes a plurality of pick-up guides 76, one for each of the travel lanes 11 (as shown, one for each of lanes $11_1$–$11_9$). The pick-up guide 76 is configured to define a minor portion of the travel path. The pick-up guide 76 includes an ingress portion 76i and an egress portion 76e. The pick-up guide 76, as shown, may, in certain embodiments, be configured with a ramp portion 76r between the ingress and egress portions 76i, 76e (see also FIGS. 10A and 10B). The pick-up guide 76 includes a floor portion 76f and two opposing upwardly extending sidewalls 76w1, 76w2 that help retain the food in its respective lane as it travels through the pick-up guide 76. Upstream of the router guide assembly 75, the travel lanes include a floor 30 that may be configured as a moving floor 30. The floor 30 can be defined by rollers, belts, or one or more conveyors (serially aligned and/or side by side) or may include a stationary floor 30. In certain embodiments, as shown in FIG. 2, the floor 30 may be operably associated with guidewalls 30w1, 30w2 (referred to generally as "30w" in certain subsequent figures) that help separate the travel lanes 11. As shown by the lateral broken lines in lane $11_1$, selected sidewalls 30w may be configured with apertures that expel forced gas or air to form a blowing gas region 40 that directs the gas across the product 25 to deflect the leading edge of the product 25l away from the fowardmost portion of the product as will be discussed further below.

In certain embodiments, the pick-up guide floor 76f is stationary and the food item is propelled through the pick-up guide 76 via its forward momentum with sufficient speed and/or force to inhibit deformation of the food item as it travels through the pick-up guide 76 and/or lateral food transfer region in the tier. In other embodiments, the floor or a portion thereof 76f may be configured with moving components such as conveyors, rollers, bearings, or other discrete translatable, rotatable, or sliding components, as is well known to those of skill in the art.

FIGS. 3A–3F illustrate a series of operations that can be sequentially carried out by leading edge forming devices 10 positioned along a portion of the predetermined travel path of the product 25 to cause the leading edge of the product 25l to overlie the outer surface of a rearward portion of the product. As shown, the leading edge can be formed to overlie the upper portion 25u of the primary body of the product 25p according to embodiments of the present invention. FIG. 3A illustrates the product 25 on a support floor 30f as it approaches first a region of (upwardly) blowing gas 40, then an overlying liquid introduction source 45, and then an overlying deflecting and/or forcing member 50.

In contrast to the blowing gas arrangement shown in FIG. 2, the blowing gas region 40 is shown in FIG. 3A as a series of nozzles 40n. The blowing gas region 40 has a length that extends over a portion of the travel path of the product (below the product) 25. The length may be such that the blowing gas is directed upwardly about the food 25 prior to the liquid introduction source 45 and terminates about a region that is coincident with the liquid introduction source 45 and/or extends beyond the liquid introduction source to an upstream location. That is, the liquid source 45 can be located downstream of the upstreammost portion of the floor that emits forced gas (or allows passage of the gas). The blowing gas region 40 can be configured to expel gas (such as air or other desired food-compatible gas) with sufficient force to cause the leading edge 25l of the product to rise vertically (and may be made to be substantially orthogonal to the floor 30f) as shown in FIG. 3B. As also shown in FIG. 3B, the blowing gas region 40 may be configured from different forced air or gas means.

In the embodiment shown in FIG. 3B, an air supply source 40s is in fluid communication with a plenum or air distribution channel that includes apertures 40a aligned below the food that distributes the air upwardly over the desired region. In other embodiments, the apertures 40a are formed into the floor 30f itself and the floor 30f forms the top surface of the distribution system, similar to an air hockey table. The floor 30f, at least in this region, may be formed of a stationary segment of the travel path, or include a conveyor with a surface (of suitable material, such as stainless steel) that can expel the air or gas. In other embodiments, the floor 30f can be defined by two spaced apart rods (11r, FIG. 5), with the forced air or gas region 40 located intermediate thereof and substantially aligned with the center of the product so as to be able to cause the leading edge 25l to rise. For additional discussion of the flooring configurations and travel lanes, see U.S. Provisional Patent Application Ser. No. 60/354,097, the contents of which are hereby incorporated by reference as if recited in full herein.

In other embodiments, as discussed above, one or more of the sidewalls 30w1, 30w2 (FIG. 2) of the travel path can be configured to expel air or gas across the product. If a downward deflection is desired, then a ceiling or overhead forced gas expulsion arrangement can be used. Combinations of the above-described forced gas expulsion systems can also be employed.

FIG. 3C illustrates one embodiment, in which liquid can be introduced (dripped, sprayed, or otherwise transferred) from the liquid source 45 onto the product 25. As shown, the liquid is introduced downstream of the initiation of the blowing air or gas region 40 so that the leading edge is blown (shown as directed upward away from the floor 30f) prior to the liquid dispersion point. This configuration may reduce the amount of air/gas pressure required to lift the leading edge (as liquid adds weight to the product). In other configurations, liquid may not be used and/or liquid may be introduced with or prior to the blowing region 40. Liquid may facilitate the attachment of the leading edge 25l to the upper portion of the body of the product 25u. In other embodiments, liquid is not required as the casing and/or food material(s) itself exhibit sufficient adhesive properties to allow the leading edge to sufficiently attach to the primary body of the product 25p without such additive. Of course, in lieu of liquid, powder, gas, aerosol, or combinations of liquid or the other constituents or forms as well as other suitable food-compatible bond promoters may be used.

Referring now to FIG. 3D, the product 25 is shown under a forcing member 50 that forces the leading edge 25l rearward (in an upstream direction, opposite the primary direction of travel) onto the upper portion 25u or back surface of the primary body of the product 25p. As shown, the deflecting or forcing member 50 is a pressing member such as a rotatable rod, bar, or roller 50r that can rotate as the food moves thereunder. In other embodiments, the pressing member 50 is a stationary (non-rotatable) member. As such, the forcing member 50 can be a stationary, free-rotating, or self-propelled member. The direction of turning indicated by the arrow by the forcing member 50 is by way of illustration of the movement of this movement and is not to be interpreted as limiting to the direction of turning. For example, if the forcing member 50 is rotatable responsive to contact with the forward movement of the food, the direction of rotation may be as shown in FIGS. 3D, 6B, 7 and 8. If the member 50 is self-driven or independently powered, the direction of rotation may be the reverse.

The member 50 can be located such that it is vertically spaced above the floor 30f or the food 25 to be proximate the height of the food product so that it touches or contacts the upper portion of the product 25u substantially without deforming the shape of the product as the product moves thereunder. The blower region 40 may extend a length that positions a portion of it under the member 50. The deflecting or forcing member 50 may be provided by other deflecting means and may be otherwise configured as will be appreciated by one of skill in the art. For example, the deflecting member 50 may be provided via an air or gas stream as will be discussed further below.

In operation, the product 25 can move substantially continuously through each of the blowing region 40, the liquid introduction source 45 (where used), and deflecting and/or forcing member 50. The product 25 may move at a constant or variable speed. In particular embodiments, the product 25 moves at a substantially constant rate of about 1–10 ft/sec, and typically about 3–6 ft/sec, as the leading edge is shaped as described above. The relative spacing and length, size, and/or position in the travel lane of one or more of the blower region 40, the liquid source 45, and the forcing member 50 can be set based on the movement or product speed, size or weight of the product, and the like.

FIG. 3E illustrates that another air or gas source 60 may optionally be used to facilitate the forward inclined movement of the product 25. FIG. 3F illustrates the leading edge 25l reshaped onto the primary body of the product 25p and moving downstream in the processing system in its predetermined travel lane. Of course, the travel lane 11 is not required to include a lateral lane change or pick-up chute 76. Rather, the blower region 40 and the forcing member 50 may be used in other configurations or locations of the travel path depending on the application. It may be particularly suitable to employ such leading edge re-forming devices where the product is directed to travel up or down inclines so as to inhibit the tendency of the leading edge portion 25l to snag or inhibit the progress of the product, particularly in systems configured to propel or keep the food moving along its predetermined travel path in a substantially continuous automated manner.

The food processing system may include a detection means such as an optical detector 56 (FIG. 3A) that is located at a desired upstream location that detects when the leading edge 25l of a product 25 passes by a certain location. Upon detection of the encroachment of the leading edge 25l, the detector 56 can then intermittently activate one or more of the blower region 40, the liquid introduction source 45 and/or the forcing member 50 in response thereto. The optical detector 56 may comprise an infrared laser or light source that extends across a respective travel lane 11 in communication with a controller (not shown) as is well known to those of skill in the art In operation, as the leading edge 25*l* progresses along the lane 11 in advance of the forming devices, the beam is disrupted, signaling the controller that the product is approaching. In other embodiments, the leading edge forming devices 10 may be configured to operate intermittently at desired time intervals that can be set to correspond to the length of product and speed of movement thereof.

Figure 4A:
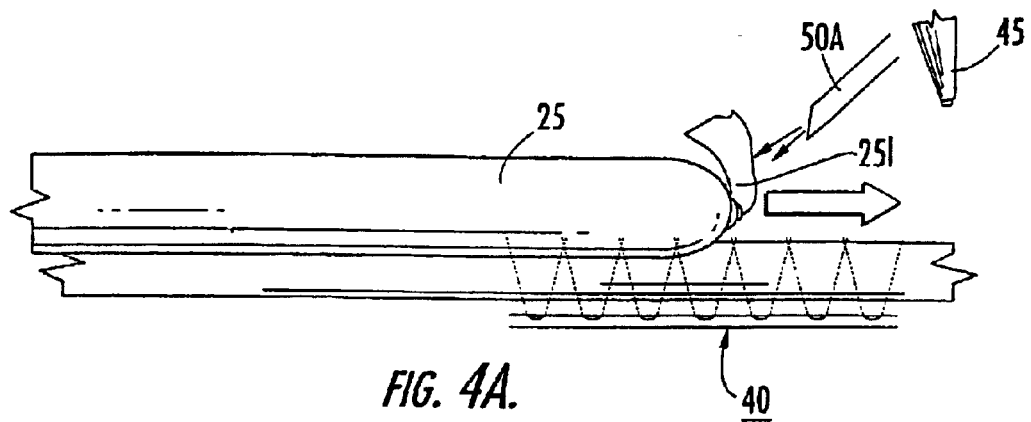
FIGS. 4A–4C are side partial cutaway views of a portion of a predetermined travel path illustrating a sequence of operations as the food time moves along the travel path to shape the leading edge according to additional embodiments of the present invention.
Figure 4B:
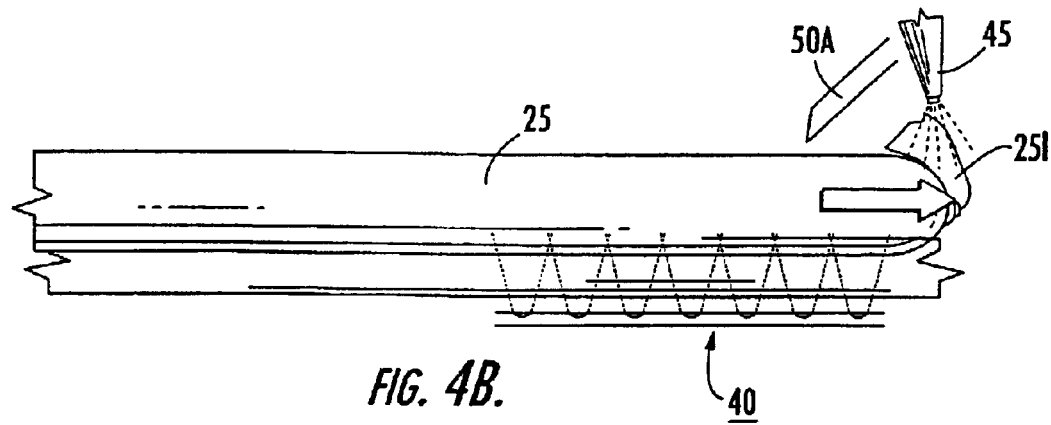
Figure 4C:
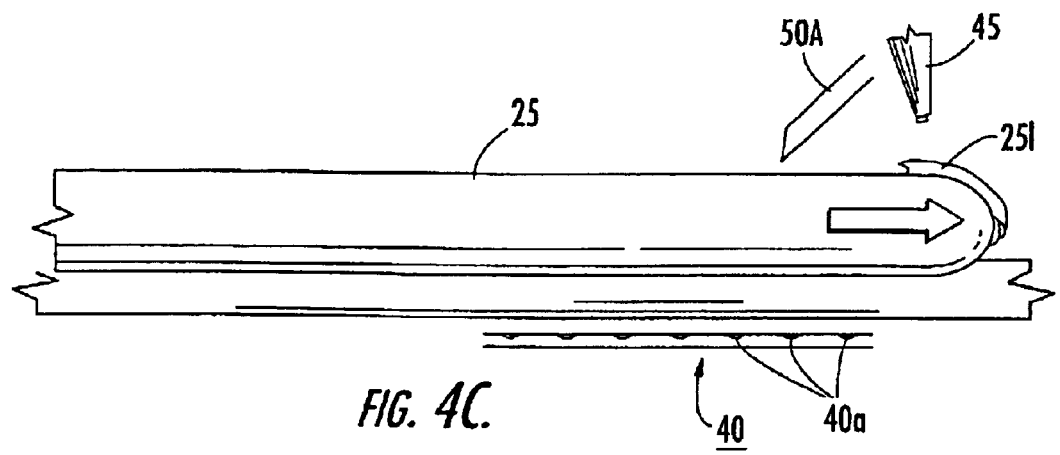

FIGS. 4A–4C illustrate an alternate embodiment of leading edge forming devices 10'. As shown, the forcing member 50, rather than being a pressing member, comprises an air knife 50A positioned, in operation, above and forwardly proximate the product 25. It is noted that the term "air knife" means fluid comprising gas or air can be forcibly expelled from the device. In operation, the leading edge portion 25*l* can be blown in a desired direction (shown as upward) and then rearward. The air knife 50A is configured so that it expels sufficient air or gas to force or blow back the leading edge portion 25*l* onto the upper portion 25*u* of the primary body of the product 25*p*. FIGS. 4A–4C illustrate that the gas or air blowing region 40 is positioned so that air or gas is introduced to blow the leading edge upward prior to the rearwardly-directed forced gas blowing provided by the air knife 50A. The liquid from the liquid source 45 can be introduced (where used) concurrently or subsequent to activation of the air knife 50A. In particular embodiments, the liquid can be applied before the air knife 50A. In yet other embodiments, a pressing member can be positioned after the air knife 50A (not shown). FIGS. 4A–4C illustrate that the liquid source 45 may be alternatively disposed downstream of the air knife 50A. In other embodiments, the liquid source can be disposed upstream of the air knife and the sequence and timing of activation controlled to yield the desired moisture at the desired time. Combinations of the above may also be used.

Figure 5:
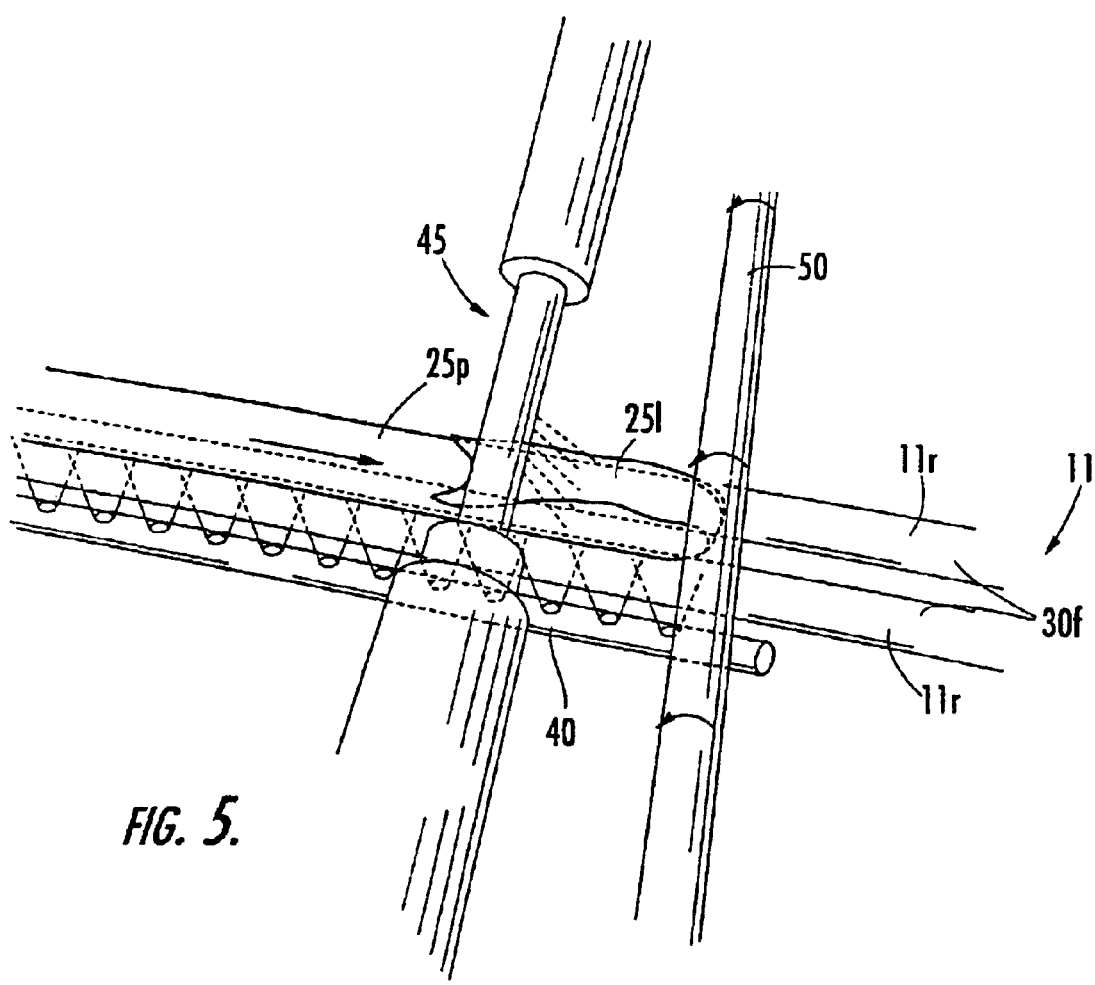
FIG. 5 is a perspective view of a portion of a predetermined travel path illustrating another embodiment of the present invention.

FIG. 5 illustrates that the liquid introduction source 45 can be a laterally extending spray bar 45*s* that extends across the travel lane 11 (or a plurality of lanes). The spray bar 45*s* is in fluid communication with a liquid source and is configured with apertures that, in operation, disperse, spray, or drip liquid onto the product 25 (at least the forward portion) as the product 25 moves thereunder. The blowing region 40 can start at a position in the travel lane that is a distance in advance of the spray bar 45*s*. Also, as shown in FIG. 5, the leading edge portion 25*l* of the product may be already rearwardly positioned (or oriented) onto the primary body of the product before it reaches the forcing member 50 (shown as a pressing member). The spray bar 45*s* may be vertically positioned above the height of the product 25 but sufficiently close to lightly contact the leading edge portion as it travels thereunder. In certain embodiments, the liquid is dispersed onto the leading edge portion 25*l* after a forwardmost portion of the primary body of the product travels to or past the pressing member 50. As before, the forcing member 50 can be a pressing member such as a rod or bar that is stationary, free-rotating, or self-propelled to rotate at a desired speed.

Figure 6A:
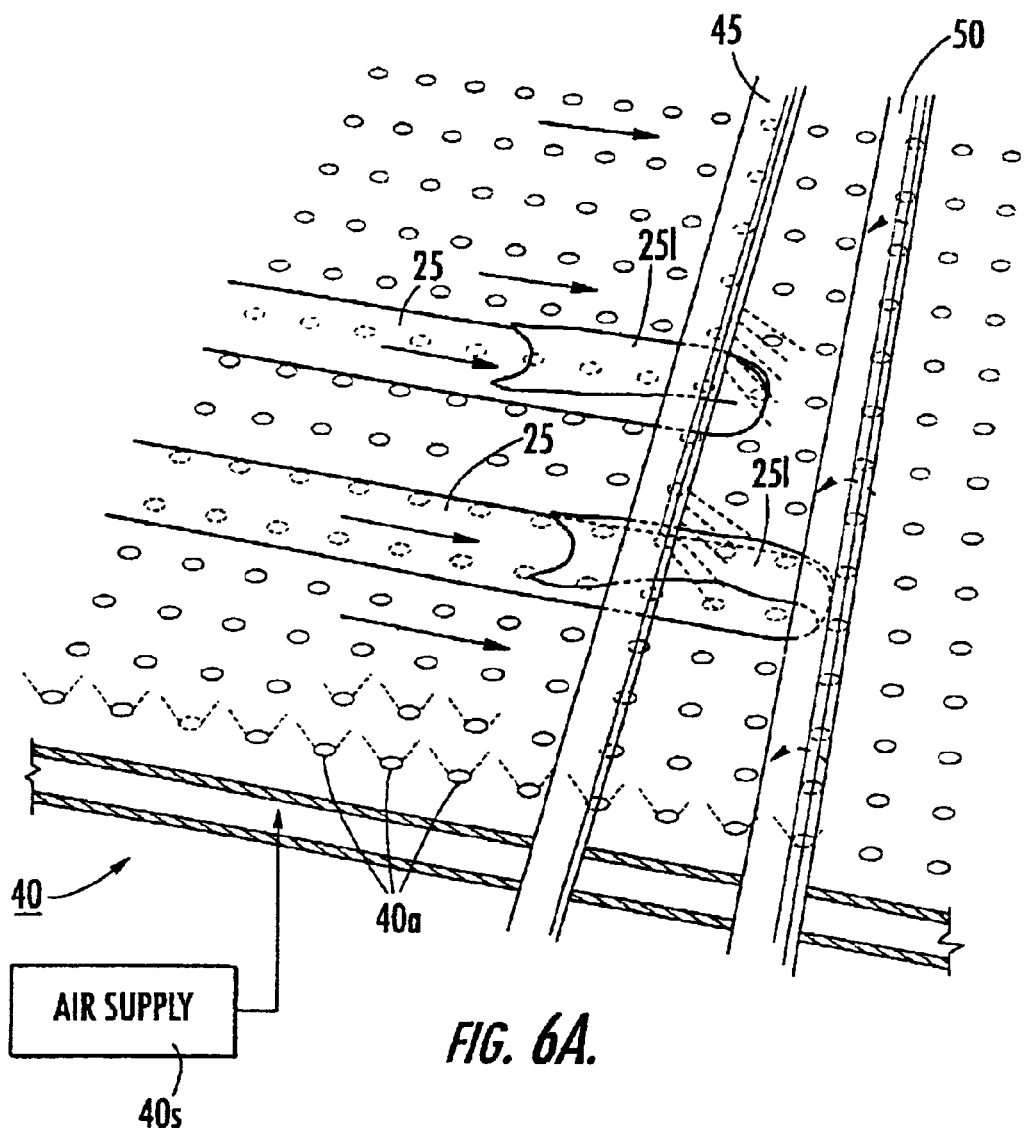
FIG. 6A is a perspective view of a portion of a predetermined travel path illustrating an additional embodiment of the present invention.

FIG. 6A shows an arrangement similar to FIG. 5, with an alternate floor configuration 30*f* and a plurality (shown with two) side by side travel lanes 11, each carrying a different strand of food 25, with the spray bar 45*s* and the forcing member 50 configured to extend across a plurality of lanes so as to concurrently or sequentially shape different products as the product moves along the predetermined travel path in the food processor. Again, the forcing member 50 may be a stationary, free-turning, or driven rod.

FIG. 6B is a side view of the arrangement shown in FIG. 6A that illustrates the spatial alignment of the spray bar 45*s* and the forcing member 50 according to particular embodiments of the present invention. As shown, the spray bar 45*s* is located at a height that is greater than the forcing member 50. The forcing member 50 may be configured as a rod that rotates responsive to contact with the food moving thereunder, or may be powered to rotate independently thereof. The optional rotating feature is indicated by the broken line arrows in the section view of the member 50. The forcing member 50 (and liquid source 45) may also be retracted and extended during operation (not shown). FIG. 6B also illustrates that the blowing region 40 can be provided by an air distribution system that channels air from an air supply source 40*s* along a length of the travel path, forcing the air out and up through the vents or apertures 40*a* in the floor 30*f*.

FIG. 7 is a side view of another embodiment of leading edge forming devices 10. In this embodiment, two serially spaced rotatable members $50_1$, $50_2$ (such as laterally extending rods) are used to secure or shape the leading edge portion 25*l*. As before, the blowing region 40 can be located in the travel lane downstream of the rotatable members and may extend at least through the location proximate the first member $50_1$. The liquid source 45, where used, can be located intermediate the first and second members $50_1$, $50_2$, respectively.

FIG. 8 illustrates another embodiment, in which the forcing member 50 is a wet member 50*w*, thus combining the liquid introduction with the rolling of the product 25. This allows the leading edge of the product 25*l* to be wetted and rolled concurrently by the same device The wet member (such as a rod or roller) 50*w* may be configured to emit liquid via apertures on an external surface that is fed from an internal fluid channel that is in fluid communication with an exogenous liquid supply (not shown). A number of other wetting configurations may also be employed as is known to those of skill in the art. For example, the member 50*w* may be configured with an external wiping reservoir that reapplies liquid as the bar rotates therethrough. In other embodiments, the external surface of the wet member 50*w* may be periodically sprayed with a liquid from a source located in the processor at a location that allows the liquid to be automatically dispersed onto the outer surface of the wet member at desired wetting intervals (not shown).

FIGS. 9A–9C illustrate yet another embodiment of a device that can be located in the travel lane 11. This device comprises an extendable and retractable knife cartridge 55 that is configured to cut or remove the leading edge portion 25*l* of the product. FIG. 9A illustrates that prior to the product entering the ramp to the pick-up guide 76, the knife cartridge 55 operates to quickly punch down between the product 25*b* body and the leading edge 25*l* to remove a substantial amount of the leading edge portion 25*l* of the product. The timing of the cutting may be such that, for linked or segmented products held in casings, the cutting leaves in place the twisted or pinched portion of the casing. FIG. 9B illustrates that the remains of the casing or leading edge portion may be vacuumed into a debris port at the cutting location to inhibit build-up in the travel lane. Other removal means such as, but not limited to, blowing means, may also be used as desired. FIG. 9C illustrates that the product with its closely cut forward end portion is free to travel up an inclined portion of the travel path (perhaps a pick-up guide 76 that directs the food to travel upwardly a distance) and, in certain embodiments, to laterally translate into a different one of the travel lanes, downstream of the cutting activity, in the food processor.

Figure 10A:
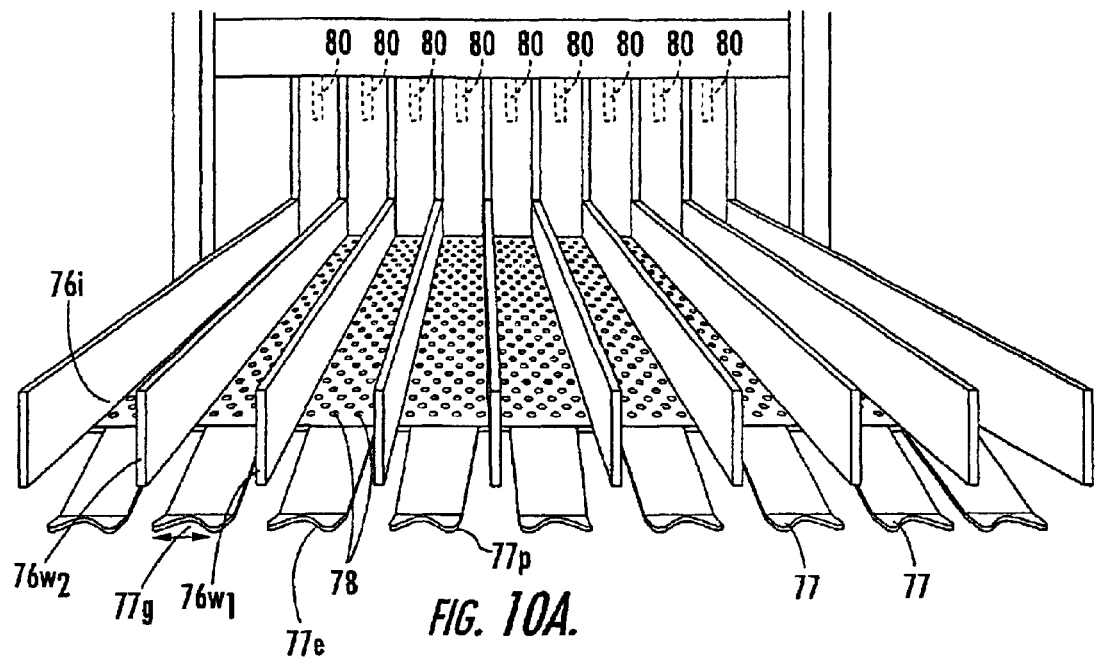
FIG. 10A is front view of a mechanism that includes a plurality of side-by-side chutes that act as pick-up guides according to embodiments of the present invention.
Figure 10B:
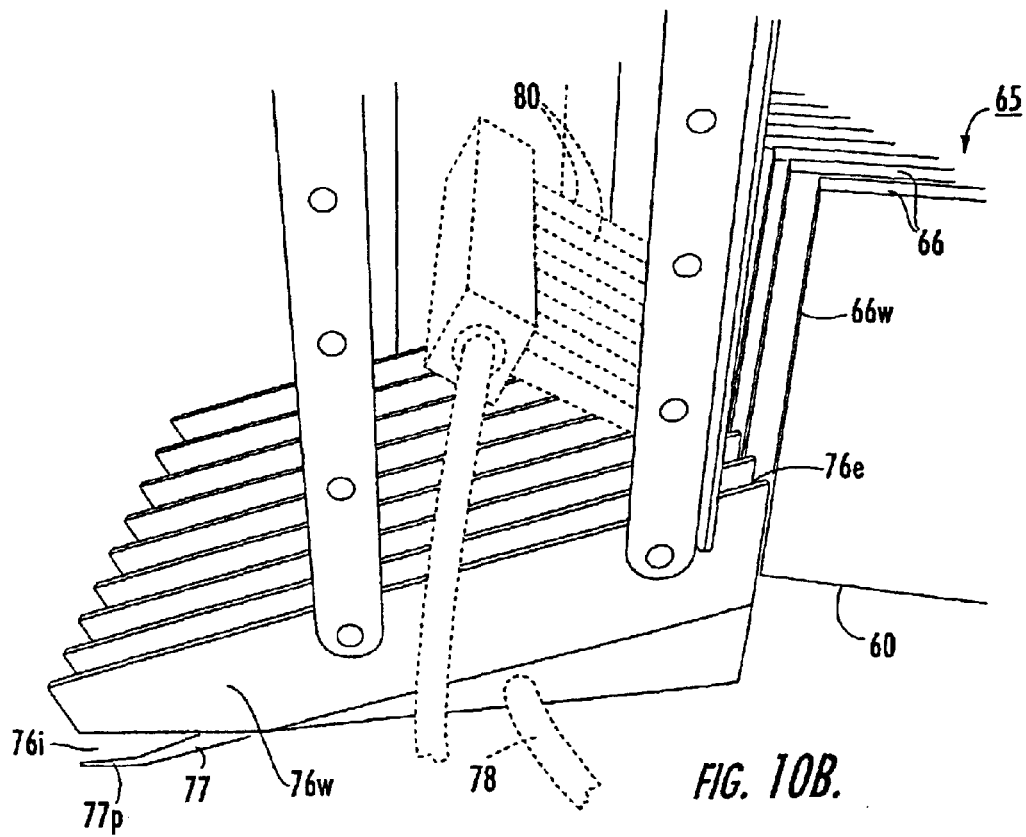
FIG. 10B is a side view of the device shown in FIG. 10A.

FIGS. 10A and 10B illustrate that the predetermined travel path may include a pick-up guide 76. In the embodiment shown, the pick-up guide 76 is disposed in the travel lane as the food approaches the lateral adjustment or lane transition region or zone 100z on the travel path in the tier of a food processing unit or system. In other embodiments, the pick-up guide 76 may be configured so as to be offset from the travel direction of the food (not shown).

As shown in FIGS. 10A and 10B, the front edge or ingress portion 76i of the pick-up guide 76 can include a forward member 77 or scoop that includes a substantially planar portion 77p. As shown, the forward member 77 can include an edge portion 77e that is forked. In operation, as the food is moved or moves forward on the floor 30 (FIG. 2), the forward member 77 can be configured to cooperate with the floor 30 so that, in operation, the food travels off the moving floor 30 onto the upward surface of the forward member 77. The forward member 77 and the floor of the pick-up guide 76f may be formed from stainless steel or other suitable material, as is known to those of skill in the art. The forward member 77 may reside on the surface of the floor 30. In certain embodiments, the forward member 77 acts as a stationary finger that can scoop or pick-up the food 25 as it advances in the travel path along the floor 30 to contact the forward member 77. FIGS. 3A–3F illustrate an alternate embodiment of the pick-up guide 76 where the forward member 77 may be an elongated finger 77f that is located below the surface level of the floor 30f to direct the food upwardly thereon and into the pick-up guide 76.

In certain embodiments, the food is held so that it is substantially centered over the gap 77g defined by the fork (the gap narrowing toward the ramp portion 76r of the router guide) even when the food is moving at a rate of between about 1–20 feet per second, typically about 1–10 ft/sec, and more typically about 5 ft/sec, just before it enters the pick-up guide 76. Other speeds may be used depending on the parameters of the application (dwell time, food configuration or size, food density, food friction, and the like). In other embodiments, the food and its support floor 30 are stationary, and the pick-up guide 76 can be configured to translate to engage with the food to dislodge, pick-up, pull, or push the food from the floor 30 (not shown).

As shown in FIGS. 10A and 10B, each pick-up guide 76 can be configured to share sidewalls 76w with its neighbor such that the inner sidewall of one pick-up guide 76 is the outer sidewall for adjacent pick-up guides 76. The sidewalls 76w themselves may be configured to start at a height that is above the height of the floor (or at or above the height of the sidewalls 30w, FIG. 3b) at the ingress portion 76i; as such, the walls 76w may angularly converge down to attach to the floor 76f of the pick-up guide 76r in the ramp portion 76r.

FIG. 10B also illustrates that the router guide assembly 75 can be operably associated with a lateral changeover or lateral router guide 65. The lateral router guide 65 includes a plurality of side-by-side guide lanes or channels 66, one each configured to communicate with a respective one pick-up guide 76. The lateral router guide 65 includes a floor 60 that may be stationary or moving. In certain embodiments, the floor 60 is defined by a diverter conveyor 60c. The floor 60 or diverter conveyor 60c can be configured so as to define a minor or relatively short portion of the travel path on a particular tier and can guide or direct the lateral transition of the food from one travel lane to its next desired lane. As shown in FIG. 10B, the guide channels 66 each include a pair of upwardly extending opposing sidewalls 66w that overlie the floor 60. The diverter conveyor 60c may be an endless loop conveyor as shown.

As shown in FIG. 10B, the walls 66w of the guide channels 66 can be configured to define a portion of the travel path that is angularly offset relative to the respective forward and rearward portions of the travel path or lane. The walls 66w can be disposed in parallel, evenly spaced, angularly offset orientation, from the forward portion of the guide channel 66f to the rearward portion of the guide channel, to guide the lateral translation of travel from adjacent lanes. The guide channels 66 may include a ceiling portion (not shown) that, with the opposing sidewalls 66w and underlying conveyor floor 60, define enclosed channel spaces for each of the lateral transition lanes.

The leading edge forming operations can be carried out along a level portion of the travel path or as the food advances up or down along inclined or declined portions of the travel path such as when the product is held at an angle.

In certain embodiments, the product may be held so that it is substantially stationary and the forcing member 50 (and liquid source 45) can be configured to be mobile and dynamically moved about the product and/or along selected portions of the travel path to perform the operation. In still other embodiments, the devices 50, 45 can be moveably configured to repetitively move about a limited portion of the travel path while the product is also moving.

The food processing system may be configured as a vertically stacked tier arrangement, with a plurality of longitudinally spaced tiers, configured to provide a desired vertical height(s) and residence time in each tier (or, combined, the residence time in the food processor). As used herein, the term "stacked" means that the tiers are positioned as vertically or longitudinally spaced tiers (columnated or aligned and/or misaligned with respect to adjacent tiers), each tier extending within a certain vertical region of the processor. Each tier can define a portion of the travel path in the processor for the food item and can be any desired shape such as, but not limited to, linear, curvilinear, circular oval, rectangular, hourglass, or "FIG. 8." The tiers can be arranged such that each tier overlies or underlies the next adjacent tier in the travel path. The travel path is the path that the food travels within a particular tier as it travels in the food processor from the inlet to the outlet. In certain embodiments, each tier or zone (a plurality of selected tiers) can be configured to have an individually controlled environment (as is well known to those of skill in the art) to provide the desired operating environments to provide the desired physical treatments such as moisture or humidity (sprinkling), air velocity, gas exposure, temperature and the like.

The travel lanes 11 may be linear, curvilinear, circular, or other desired shape. Of course, other numbers of lanes 11 (larger or smaller numbers) can be used and different numbers of lanes can be used on different tiers or levels. The lanes do not necessarily need to abut and can be spaced apart as desired, with the router guide 65 and respective guide channels 66 configured to provide the desired amount of lateral translation needed to accommodate the desired lane spacing and translation. The configurations can also be used with a single tier designs as well as with linear systems. In particular embodiments, each tier can have "n" number of separate groupings of lanes, such as 2–6, and each grouping can be termed a "highway". Similarly, each highway can be associated with a plurality or "n" number of lanes, such as 2–10 lanes, and in certain embodiments about 9 lanes.

The angle of incline (or decline) of the forward member of the guide 76 can be selected so as to inhibit the disruption of the food as the food 25 transfers from the moving floor to travel over the forward member. Typically, the angle of incline will depend on the size and/or weight of the product, the speed of the product/moving floor upstream thereof and the like. The angle of incline for the forward member and/or the ramp 76r can be any desired angle, typically under about 90 degrees. In certain embodiments, the angle can be about 10–80 degrees, and in particular embodiments about 20–70 degrees. In some embodiments, the angle of both or one of the forward member and/or the ramp portion is about 45 degrees.

For automated continuous movement systems the shaping, forming, or cutting of the leading edge portion 25l can be carried out in a manner that inhibits the disruption of the continuous automated (forward) movement.

In particular embodiments, the lanes 11 can be configured or formed using one conveyor having a sufficient width to provide the number of lanes, or by using at least two (two or more) side-by-side cooperating conveyors. The conveyors can "cooperate" in that they may be configured to be in communication and operate together to either hand off or receive food from the other conveyor so that the food serially (directly or indirectly) travels first on one then on the other. The cooperating conveyors can be configured as side-by-side and/or in-line conveyor arrangements. Of course other combinations of conveyors (such as side-by-side alone, in-line alone, or other quantities or shapes of conveyors arranged to define the travel path and/or lanes) can also be used. Additionally, two or more sets of cooperating conveyors can be used to concurrently process different food items (or strands or sets of items) about the same tier (not shown). See U.S. patent application Ser. No. 09/888,925 to Shefet et al. for additional description of conveyor configurations, the contents of which are hereby incorporated by reference as if recited in full herein.

The conveyors on each tier or between tiers can be operated or adjusted so as to run at the same or different conveyor speeds. In certain embodiments, the food processing system can be configured to concurrently process a plurality of elongated strands (such as, but not limited to, about 4–50 strands). In certain embodiments, about seven to fourteen separate strands of elongated continuous food product can be introduced into the food inlet and onto the upper tier. In so doing, the surface of the lanes 11 can include holding grooves or guides to help position the strands side-by-side on the respective travel paths in each tier. As such, each travel lane shown in FIG. 2 can hold a discrete strand of food product or the strand may have a length such that it covers more than one lane during processing which travel concurrently serially about each of the lanes to make the desired number of revolutions at each tier.

Figure 11A:
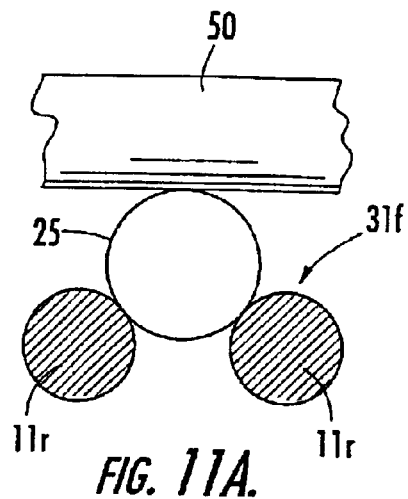
FIGS. 11A–11E are schematic front section views of a portion of a travel path with the food and forming mechanism shown oriented in different spaced relationships according to embodiments of the present invention.
Figure 11B:
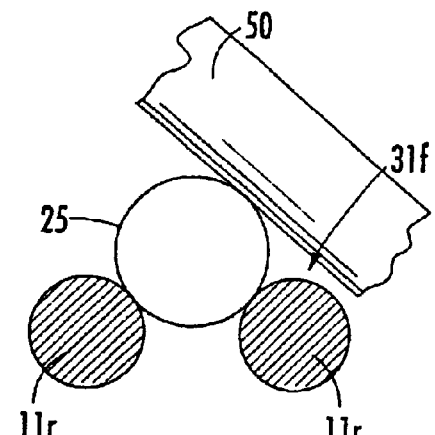
Figure 11C:
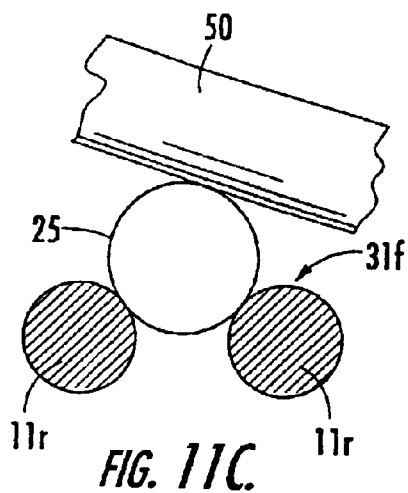
Figure 11D:
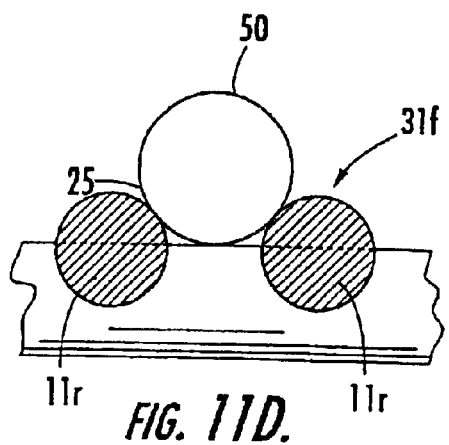
Figure 11E:
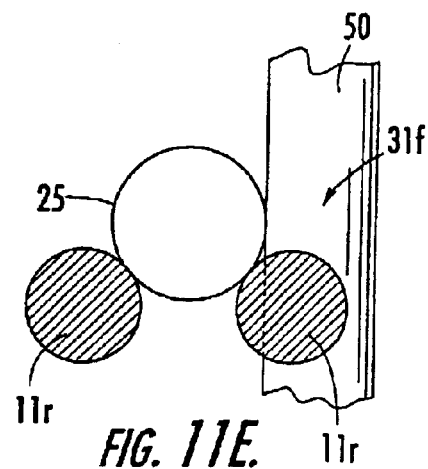

FIGS. 11A–11E schematically illustrate different orientations that may be used to position certain of the shaping or forming mechanisms relative to the product and the floor 31f. In these examples, the floor 31f is defined by two spaced apart rods 11r (as discussed for the embodiment shown in FIG. 5). Other floor configurations may also be used. As shown in FIG. 11A, the forcing member 50 can be oriented to be level and above the product. FIG. 11B illustrates that the forcing member 50 can be offset from the center of the product 25 (closer to one side of the travel path) and angled about the side of the product 25. FIG. 11C shows the forcing member 50 above the product 25 but angled from horizontal. FIG. 11D illustrates the forcing member 50 below the product 25 and FIG. 11E illustrates the forcing member 50 to the side of the product 25 and vertical. Although the device illustrated with respect to the product has been shown as the forcing member 50, any of the other forming devices (40, 45, etc.) may also be oriented in a different and desired alignment with respect to the product 25.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, where used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A method for shaping or forming the leading edge portion of an elongated food product, comprising:

moving an elongated food item forward in a primary direction of travel over a travel lane in a predetermined travel path in a food processing system, the elongated food item having a leading edge portion that extends beyond a primary body portion of the food item, the travel lane having a floor food support surface, the food item residing on the floor support surface;

blowing the leading edge portion away from the direction of travel of the food item while the food item is moving forward in the travel lane; and then deflecting the leading edge portion of the food item rearward so that it overlies and contacts the primary body portion of the food item while the food item is moving forward.

2. A method according to claim 1, further comprising introducing liquid onto an upper portion of the primary body portion of the elongated food item after initiation of said blowing step.

3. A method according to claim 2, wherein said introducing step comprises spraying liquid in a downward direction from a position above the food item on the travel lane.

4. A method according to claim 2, wherein said introducing step comprises contacting the leading edge portion and the upper portion of the primary body portion with a wet forming member.

5. A method according to claim 4, wherein the member is configured to rotate as the food item travels thereunder.

6. A method according to claim 4, wherein the member is configured to remain stationary as the food item travels thereunder.

7. A method according to claim 2, wherein said blowing step is carried out in an upward direction away from the floor support surface to blow the leading edge portion in an upward direction, and wherein at least one of said blowing, introducing, and deflecting steps secures the leading edge portion onto the upper portion of the primary body portion of the elongated food item.

8. A method according to claim 1, wherein said blowing step is carried out in a lateral direction across the product so that the leading edge portion is blown sideward away from the primary direction of travel of the product.

9. A method according to claim 1, wherein the deflecting step comprises pressing the leading edge portion against the upper portion of the primary body portion.

10. A method according to claim 9, wherein the deflecting step is carried out by moving the elongated food item under a laterally extending member that is positioned to overlie the travel lane and resides vertically above the floor of the travel lane at a height sufficient to position the laterally extending member proximate the upper portion of the food item as the food item travels thereunder.

11. A method according to claim 1, wherein the deflecting step is carried out by moving the elongated food item under an overlying pressing member that is spaced so as to press the rearwardly extending leading edge portion onto an upper portion of the primary body of the food item without substantially deforming the shape of the elongated food item.

12. A method according to claim 1, wherein the deflecting step comprises blowing the leading edge portion in a direction that is opposite the primary direction of travel in the travel lane.

13. A method according to claim 1, wherein the deflecting step comprises directing the elongated food item to travel under a plurality of serially positioned bars that extend across the travel lane.

14. A method according to claim 13, wherein the plurality of bars includes a first rotatable bar, a second sprayer bar that is configured to eject fluid onto the food as the food moves thereunder, and a second rotatable bar, wherein the first and second rotatable bars are positioned to be closer to the upper portion of the food item than the sprayer bar.

15. A method according to claim 2, wherein the blowing step is carried out during the introducing step and at least a portion of the deflecting step.

16. A method according to claim 15, wherein the floor support surface comprises a plurality of apertures positioned along a length and width of the travel lane in fluid communication with an air source, and wherein the blowing step is carried out by directing air through the apertures.

17. A method according to claim 2, wherein the deflecting step and liquid introducing step are carried out concurrently by moving the elongated food item under a member that emits liquid, the member being positioned to overlie the travel lane and reside vertically above the floor of the travel lane at a height sufficient to position the member proximate the upper portion of the food item as the food item travels thereunder so that the leading edge portion is pressed against the upper portion of the primary body portion of the food item.

18. A method according to claim 17, wherein the deflecting step is carried out without substantially deforming the shape of the elongated food item.

19. A method according to claim 17, wherein the member is configured with apertures and an internal liquid distribution channel, and wherein the liquid is emitted from the member by ejecting liquid from the apertures.

20. A method according to claim 17, wherein the member outer surface is periodically externally sprayed with an exogenous supply of liquid to provide the liquid that is thereby emitted therefrom.

21. A method according to claim 20, further comprising detecting the introduction of a food item into the travel lane, and wherein the blowing step is automatically initiated intermittently responsive to the detecting step.

22. A method according to claim 21, wherein the detecting step comprises optically detecting the movement of a leading edge portion as it travels across a predetermined location in the travel lane, and wherein the blowing and deflecting steps are carried out automatically and intermittently responsive to the optical detection.

23. A method according to claim 1, wherein the predetermined travel path comprises a plurality of side-by-side travel lanes, and wherein the blowing and deflecting steps are carried out in selective ones of the plurality of lanes.

24. A method according to claim 1, wherein the moving step is carried out by conveying the food item using at least one conveyor with an associated conveyor speed.

25. A method according to claim 1, wherein the elongated food item has a continuous length of at least about 20 feet.

26. A method according to claim 1, wherein the elongated food item is a meat product held in a casing.

27. A method according to claim 26, wherein the meat product is held in a synthetic casing that extends over the primary body of the food item and terminates into an unfilled leading edge portion.

28. A method according to claim 26, wherein the meat product is held in a natural casing that extends over the primary body of the food item and terminates into an unfilled leading edge portion.

29. A method according to claim 26, wherein the casing is a collagen casing having a pre-cure condition whereby the casing exhibits a tactile tacky exterior, and wherein the blowing and forcing steps are carried when the casing is in the pre-cure condition.

30. A method according to claim 1, wherein the blowing and deflecting steps are carried out while the food item is continuously moving forward at least about 5 fps.

31. A method according to claim 23, wherein the side-by-side travel lanes include adjacent first and second travel lanes that experience substantially the same environmental conditions.

32. A method of moving food items to be cooked or cured through a food processor having an oven and a plurality of side by side travel lanes, comprising:
concurrently transporting a plurality of strands of elongated food such that the elongated food strands travel over separate ones of side-by-side selectable predetermined travel lanes in a predetermined travel path in a food processor, the elongated food strands each starting with a leading edge portion that extends beyond a primary body portion of the food, and wherein the travel lanes each have a floor food support surface, the food strand in each lane residing on the respective floor support surface;
blowing the leading edge portion of the food strands in a direction away from the floor support surface while the food strands are moving forward, each in its respective travel lane; and then
deflecting the leading edge portion of the food strands so that they overlie and contact the primary body portion of the food item while the food strands are moving forward.

33. A method according to claim 32, wherein the elongated food strand is a meat product held in a casing.

34. A method according to claim 32, wherein the plurality of side-by-side lanes include adjacent first and second travel lanes that experience substantially the same environmental conditions.

35. A method according to claim 32, wherein the travel lanes each have major portions formed by moving floors.

36. A method according to claim 32, wherein the travel lanes are defined by corresponding pairs of spaced-apart rods with gap spaces therebetween, and wherein one of the elongated food strands span a respective gap space defined by a pair of the spaced-apart rods.

37. A method according to claim 35, wherein the travel lanes are formed from a conveyor with a floor configured to support the food strand and to provide an underlying gap space.

38. A method according to claim 37, wherein the gap space has an associated width that is at least 10–50% the width of the elongated food.

39. A device for manipulating leading edges of moving food, comprising:
a food support floor having a portion that is configured to selectively permit the passage of forced fluid therefrom;
a pressurized fluid source in fluid communication with the floor, and
a deflecting member positioned downstream of the start of the portion of the floor that emits forced fluid, said deflecting member disposed above said floor a predetermined distance, the distance corresponding to the height of a food item that, in operation, travels on the floor under said deflecting member, and wherein, in operation, the food continuously travels through the device causing the leading edge portion of the food item to be forced rearward of a primary direction of travel of the food item and attached to the back of the food item as the food item moves through the device.

40. A device according to claim 39, wherein the fluid source comprises a gas source and the floor emits forced gas, the device further comprising a liquid source configured to release liquid onto the food as the food moves through the mechanism, said liquid source positioned downstream of the upstreammost portion of the floor that permits the passage of the forced gas and proximate said deflecting member, and above the floor a predetermined distance so that, in operation, the liquid source resides above the food as the food travels thereunder.

41. A device according to claim 40, wherein the liquid source is positioned intermediate the upstreammost portion of the floor that selectively permits the passage of forced gas and the deflecting member.

42. A device according to claim 40, wherein the deflecting member is a rotatable bar.

43. A device according to claim 42, wherein the liquid source resides inside of the rotatable bar, and wherein the rotatable bar includes a plurality of liquid releasing apertures.

44. A device according to claim 42, wherein the liquid source is configured to wet the exterior surface of the rotatable bar.

45. A device according to claim 41, wherein the liquid source is a spray bar.

46. An apparatus for shaping or forming the leading edge portion of an elongated food product, comprising:
means for advancing an elongated food item forward over a travel lane in a predetermined travel path in a food processing system, the elongated food item having a leading edge portion that extends beyond a primary body portion of the food item, the travel lane having a floor food support surface, the food item residing on the floor support surface;
means for blowing the leading edge portion of the food item in a direction away from a direction of travel while the food item is moving forward in the travel lane; and then
means for deflecting the leading edge portion of the food item so that it overlies and contacts the primary body portion of the food item while the food item is moving forward.

47. A method for removing the leading edge portion of an elongated food item while the elongated food item is moving in a predetermined travel path in a food processing system, comprising:
moving an elongated food item forward over a travel lane in a predetermined travel path in a food processing system, the elongated food item having a leading edge portion that extends beyond a primary body of the food, the travel lane having a floor food support surface, the food item residing on the floor support surface; and
cutting the leading edge portion of the elongated food item to separate the leading edge portion from the primary body of the food item while the food item is moving forward in the travel lane without substantially deforming the shape of the primary body of the elongated food item.

48. An apparatus for processing elongated food product having a primary body portion and a leading edge portion, comprising:
a food travel path comprising a plurality of side-by-side travel lanes, the travel lanes each comprising at least one moving floor configured to move an elongated food product in a predetermined travel path, wherein the food product is configured to travel over at least two of said travel lanes;
a plurality of pick-up guides, a respective one for each of the travel lanes, positioned in cooperative communication with the moving floor, the pick-up guides having upwardly extending opposing sidewall portions and opposing food ingress and egress portions with a ramped portion extending therebetween; and
a cutter disposed upstream of the pick-up guides above at least one of said travel lanes to controllably extend down a distance sufficient to remove the leading edge portion of the elongated food product before the product moves into the respective pick-up guide.

49. An apparatus according to claim 48, further comprising a plurality of router guide channels located downstream of the pick-up guides and in cooperating communication therewith, each guide channel having upwardly extending side walls that overlie a guide channel floor adapted to support the food product as the food product travels through a respective guide channel, wherein, in operation, the router guide channels guide the food product from a first travel lane into a different predetermined laterally altered travel lane, wherein the upwardly extending sidewalls define an angular departure from a primary travel direction between the pick-up guides and the portion of the predetermined travel path that is located downstream of the router guide channels, so that, in operation, the at least one food product is directed to travel through a respective guide channel and laterally alter its travel path from a first travel lane to a second predetermined travel lane.

50. An apparatus according to claim 48, wherein travel lanes are configured to move an elongated meat product held in a casing, the elongated meat product having a length of at least about 20 feet.

51. An apparatus according to claim 50, wherein at least a portion of the moving floor of each travel lane has an axially extending gap space having an associated width that is sized and shaped so that, in position, the food product resides a distance above the gap space, and wherein the pick-up guide includes an protruding angularly extending member that is sized and configured to enter the gap space.

* * * * *